United States Patent
Hajati et al.

(10) Patent No.: US 10,038,361 B2
(45) Date of Patent: Jul. 31, 2018

(54) HAPTIC ACTUATOR INCLUDING FLEXIBLE FLEXURE BEARINGS HAVING A WISHBONE SHAPE AND RELATED METHODS

(71) Applicant: Apple Inc., Cupertino, CA (US)

(72) Inventors: Arman Hajati, Cupertino, CA (US); Steven P. Hotelling, Los Gatos, CA (US); Anuranjini Pragada, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 92 days.

(21) Appl. No.: 15/222,511

(22) Filed: Jul. 28, 2016

(65) Prior Publication Data

US 2017/0085163 A1 Mar. 23, 2017

Related U.S. Application Data

(60) Provisional application No. 62/329,364, filed on Apr. 29, 2016, provisional application No. 62/220,705, filed on Sep. 18, 2015.

(51) Int. Cl.
*H02K 33/00* (2006.01)
*G06F 1/16* (2006.01)
*G06F 3/01* (2006.01)
*H02K 33/16* (2006.01)

(52) U.S. Cl.
CPC .............. *H02K 33/00* (2013.01); *G06F 1/163* (2013.01); *G06F 3/016* (2013.01); *H01H 2215/00* (2013.01); *H02K 33/16* (2013.01)

(58) Field of Classification Search
CPC ...... G06F 1/163; G06F 3/016; G06F 3/03547; H01H 2215/00; H02K 33/00; H02K 33/16
See application file for complete search history.

(56) References Cited

U.S. PATENT DOCUMENTS

| | | | |
|---|---|---|---|
| 8,169,402 B2 | 5/2012 | Shahoian et al. | |
| 9,608,506 B2 * | 3/2017 | Degner | H02K 41/0356 |

(Continued)

FOREIGN PATENT DOCUMENTS

| | | |
|---|---|---|
| WO | 2013169299 A1 | 11/2013 |
| WO | 2013169303 A1 | 11/2013 |

(Continued)

OTHER PUBLICATIONS

Product Specification Sheet: Geeplus, Vibroi Vibration Actuator, 2 pages, www.geeplus.biz, downloaded on Jul. 15, 2015.

*Primary Examiner* — Mohamed Barakat
(74) *Attorney, Agent, or Firm* — Allen, Dyer, Doppelt + Gilchrist, P.A.

(57) ABSTRACT

A haptic actuator may include a housing, at least one coil carried by the housing, and a field member having opposing first and second sides. The haptic actuator may also include a respective at least one flexure bearing mounting each of the first and second sides of the field member to be reciprocally movable within the housing responsive to the at least one coil. Each flexure bearing may include at least one flexible member having a wishbone shape with two diverging arms joined together at proximal ends and having spaced distal ends operatively coupled between adjacent portions of the field member and the housing.

20 Claims, 23 Drawing Sheets

(56) References Cited

U.S. PATENT DOCUMENTS

| | | | |
|---|---|---|---|
| 2004/0227727 A1* | 11/2004 | Schena | G05G 9/047 345/156 |
| 2009/0313542 A1* | 12/2009 | Cruz-Hernandez | G06F 3/016 715/702 |
| 2010/0141411 A1* | 6/2010 | Ahn | G06F 3/016 340/407.2 |
| 2012/0025742 A1* | 2/2012 | Masahiko | B06B 1/0207 318/114 |
| 2013/0093577 A1* | 4/2013 | Park | G06F 3/0416 340/407.1 |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2017/0084138 A1 | 3/2017 | Hajati | |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

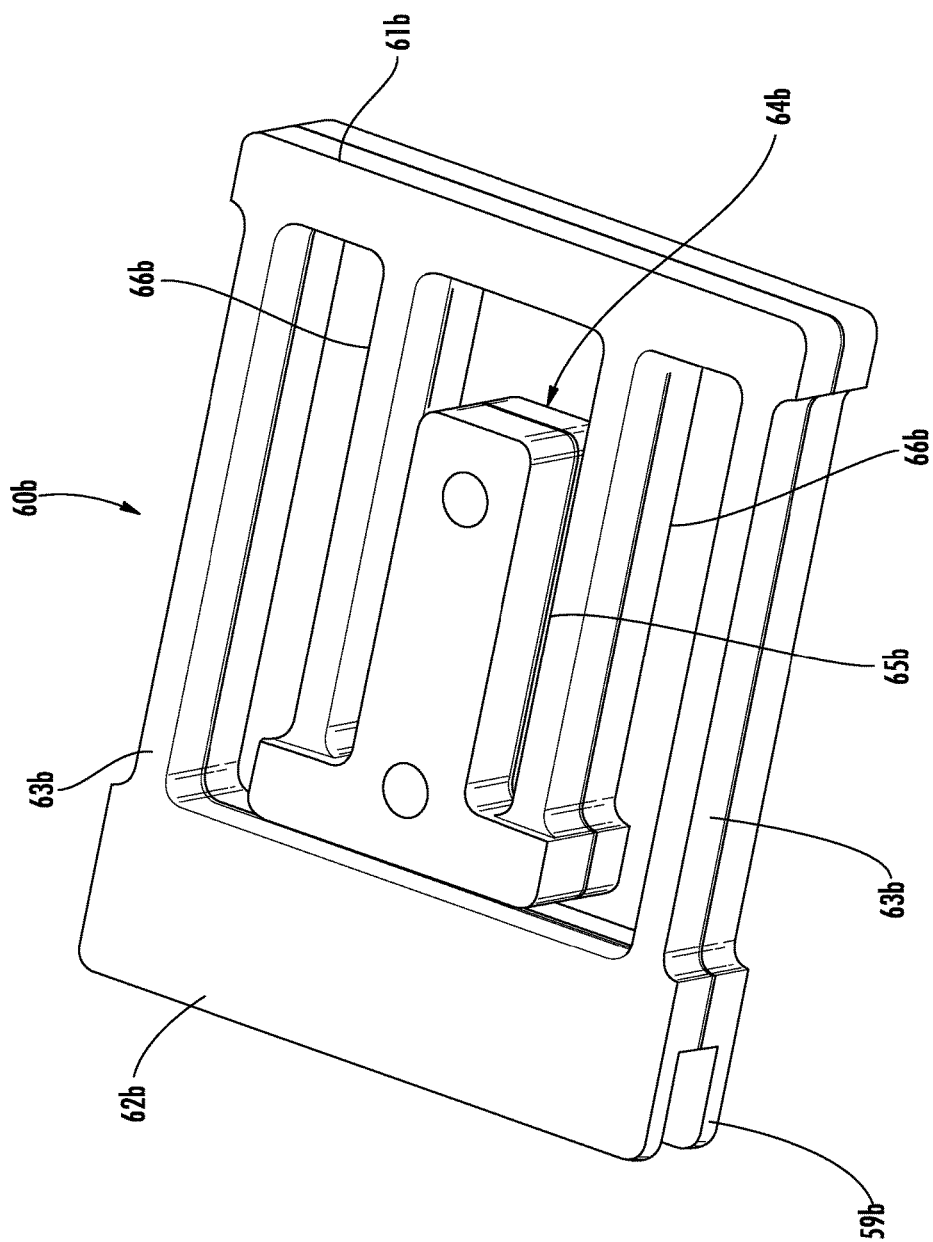

US 10,038,361 B2

HAPTIC ACTUATOR INCLUDING FLEXIBLE FLEXURE BEARINGS HAVING A WISHBONE SHAPE AND RELATED METHODS

RELATED APPLICATIONS

The present application claims the priority benefit of provisional application Ser. No. 62/220,705 filed on Sep. 18, 2015 and provisional application Ser. No. 62/329,364 filed on Apr. 29, 2016, the entire contents of each of which are herein incorporated in their entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing, at least one coil carried by the housing, and a field member having opposing first and second sides. The haptic actuator may also include a respective at least one flexure bearing mounting each of the first and second sides of the field member to be reciprocally movable within the housing responsive to the at least one coil. Each flexure bearing may include at least one flexible member having a wishbone shape with two diverging arms joined together at proximal ends and having spaced distal ends operatively coupled between adjacent portions of the field member and the housing. In another embodiment, at least one permanent magnet may be carried by the housing and the field member may include at least one coil cooperating with the at least one permanent magnet.

The at least one flexible member may have a bend therein joining together the two diverging arms at the proximal ends. The two diverging arms may include respective portions being spaced apart adjacent the proximal ends, for example.

The two diverging arms may be coupled together at the proximal ends. The at least one flexible member may include a plurality thereof, for example.

Each flexure bearing may further include at least one anchor member coupled to the adjacent portion of the housing and spaced from the adjacent portion of the field member. The at least one flexible member may be coupled between the at least one anchor member and the field member, for example.

A method aspect is directed to a method of making a haptic actuator. The method may include positioning a respective at least one flexure bearing to mount each of first and second sides of a field member to be reciprocally movable within a housing responsive to at least one coil, wherein each flexure bearing may include at least one flexible member having a wishbone shape with two diverging arms joined together at proximal ends and having spaced distal ends operatively coupled between adjacent portions of the field member and the housing.

BRIEF DESCRIPTION OF THE DRAWINGS

FIG. 5 is an enlarged perspective view of the anchor member of the haptic actuator of FIG. 3.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to refer to like elements in different embodiments.

Figure 1:
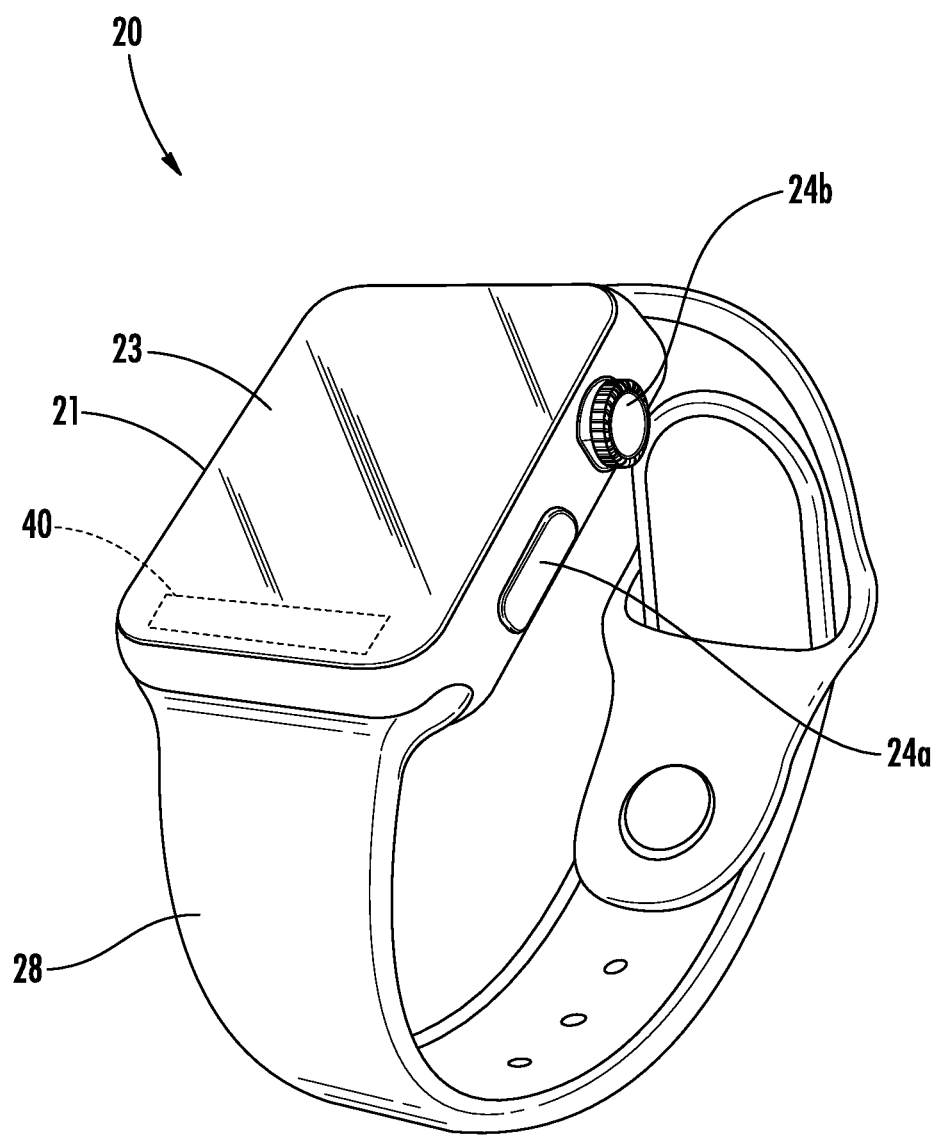
FIG. 1 is a perspective view of an electronic device including a haptic actuator according to an embodiment of the present invention.
Figure 2:
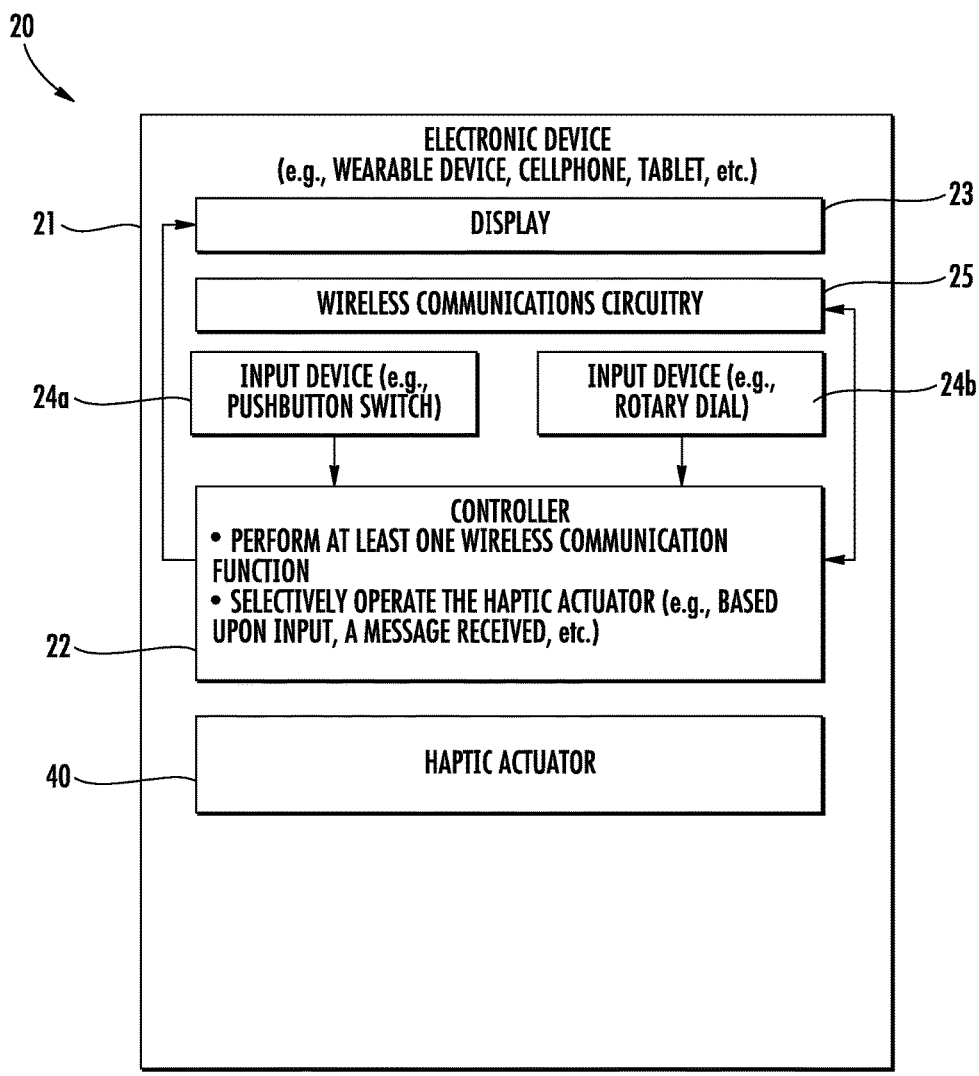
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and are coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the controller 22 applies a voltage to move a moveable body or masses between first and second positions in a y-axis.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Figure 3:
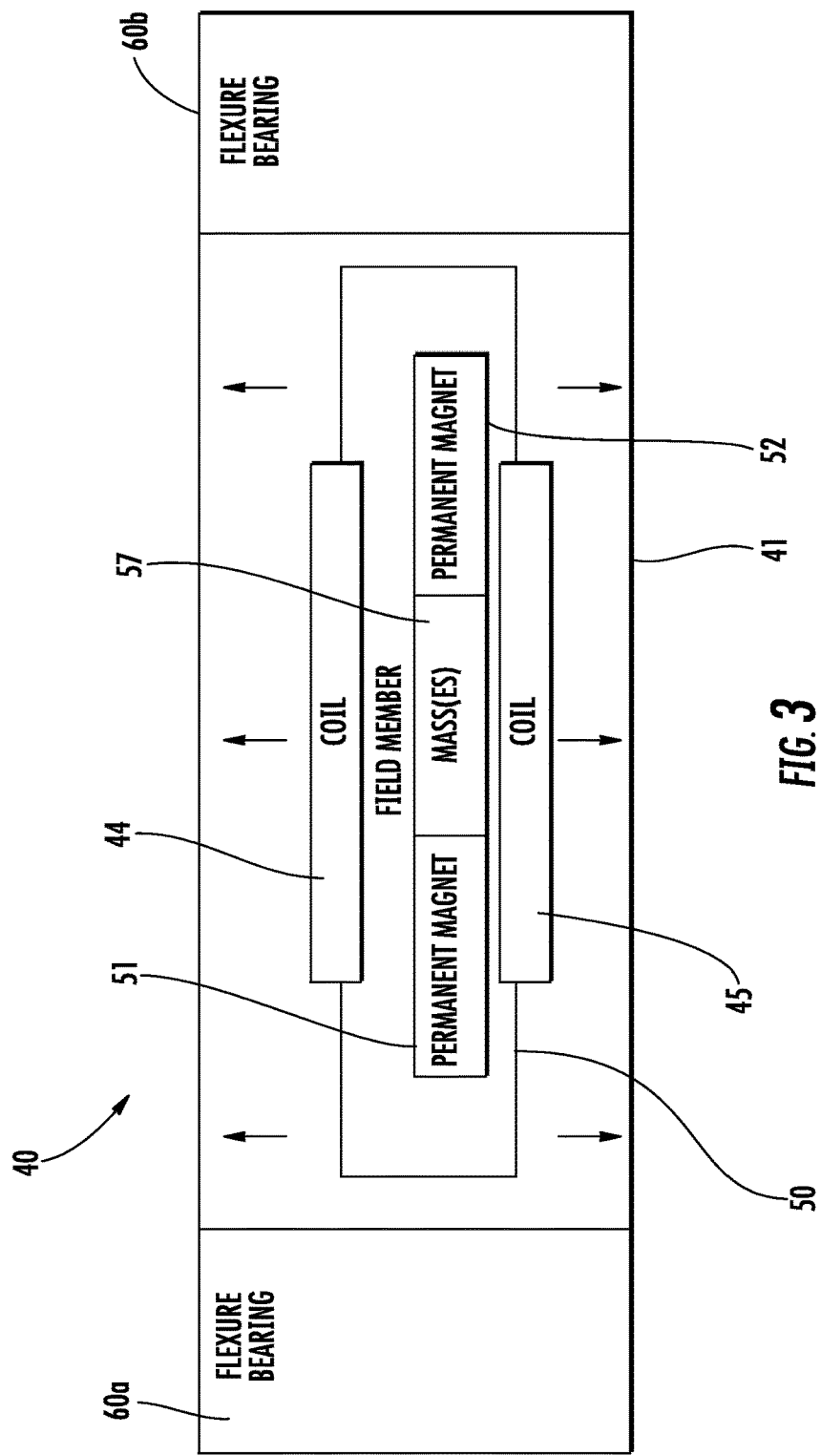
FIG. 3 is a schematic block diagram of a portion of the haptic actuator of FIG. 2.
Figure 4:
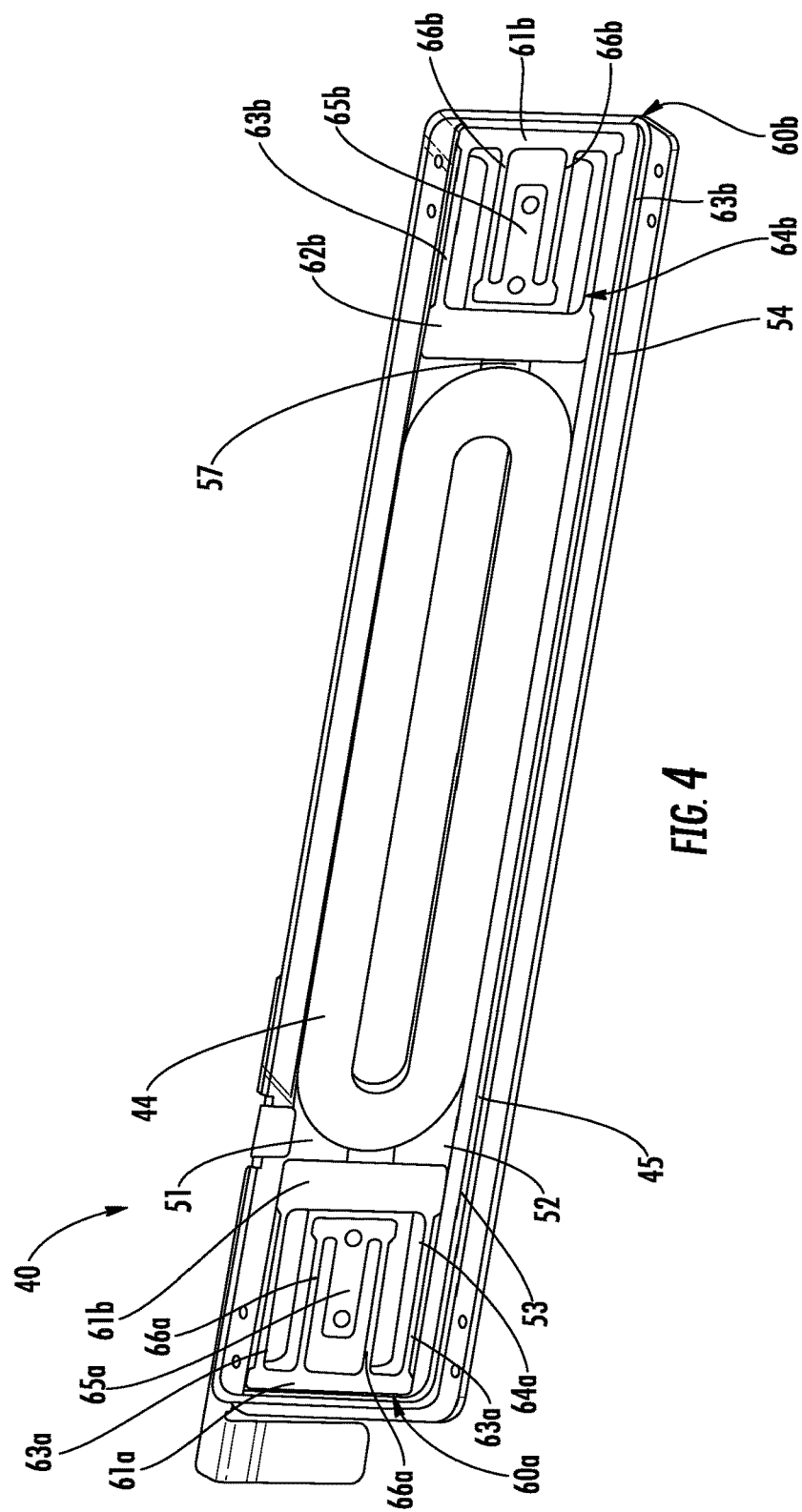
FIG. 4 is a perspective view of a portion of the haptic actuator of FIG. 1.

Referring now additionally to FIGS. 3-5, the haptic actuator 40 includes an actuator housing 41. The actuator housing 41 illustratively has a dimension in a length direction greater than a width direction. The actuator housing 41 may be ferritic. More particularly, the top and bottom of the actuator housing 41 may be ferritic. Of course other and/or additional portions of the actuator housing 41 may be ferritic.

The haptic actuator 40 also includes first and second coils 44, 45 carried by the actuator housing 41, for example, the top and the bottom, respectively. The first and second coils 44, 45 each illustratively have a loop shape or "racetrack" shape and are aligned in a stacked relation and spaced apart.

The haptic actuator 40 also includes a field member 50 carried by the actuator housing 41. The field member 50, similarly to the actuator housing 41, has a dimension in a length direction greater than a width direction. Thus, the field member 50 is reciprocally movable in the width direction (i.e., the y-direction). While the movement of the field member 50 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 illustratively includes permanent magnets 51, 52 between the first and second coils 44, 45. The permanent magnets 51, 52 may be neodymium, for example, and may be positioned in opposing directions with respect to their respective poles.

The permanent magnets 51, 52 also have a rectangular shape and are aligned along a length of the first and second coils 44, 45. While a pair of rectangular shaped permanent magnets is illustrated, it will be appreciated that there may be any number of permanent magnets having any shape between the first and second coils 44, 45.

The field member 50 also includes a mass 57 between the permanent magnets 51, 52. The mass 57 may be tungsten, for example. The mass 57 may be a different material and there may be more than one mass.

The haptic actuator 40 also includes respective flexure bearings 60a, 60b mounting each of first and second sides 53, 54 of the field member 50 to be reciprocally movable within the actuator housing 41 responsive to the first and second coils 44, 45. Each flexure bearing 60a, 60b includes a first end member 61a, 61b, and a second end member 62a, 62b. The second end member 61a, 61b is coupled to an adjacent side 53, 54 of the field member 50. The second end member 62a, 62b has a slot 59b therein (FIG. 5) receiving the adjacent side 53, 54 of the field member 50 therein.

Each flexure bearing 60a, 60b also includes a pair of parallel spaced apart flexible arms 63a, 63b coupled between the first and second end members 61a, 61b, 62a, 62b. Each flexure bearing 60a, 60b may have more than one pair of parallel spaced apart flexible arms.

Figure 6A:
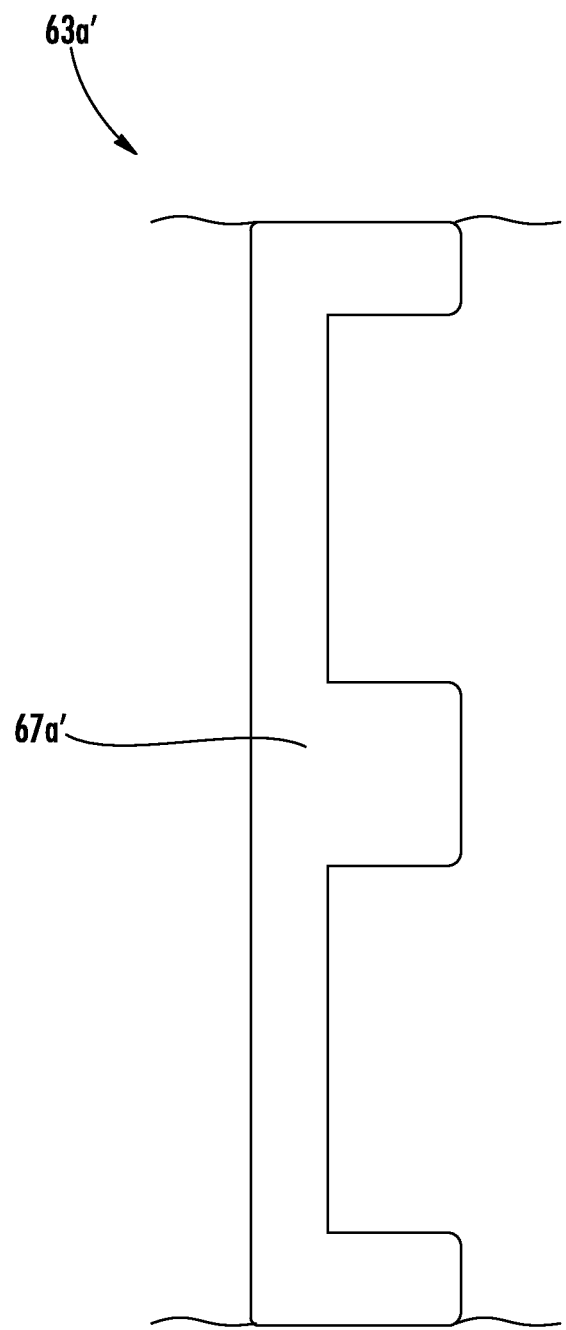
FIG. 6a is a top view of a parallel spaced apart flexible arm in accordance with an embodiment.
Figure 6B:
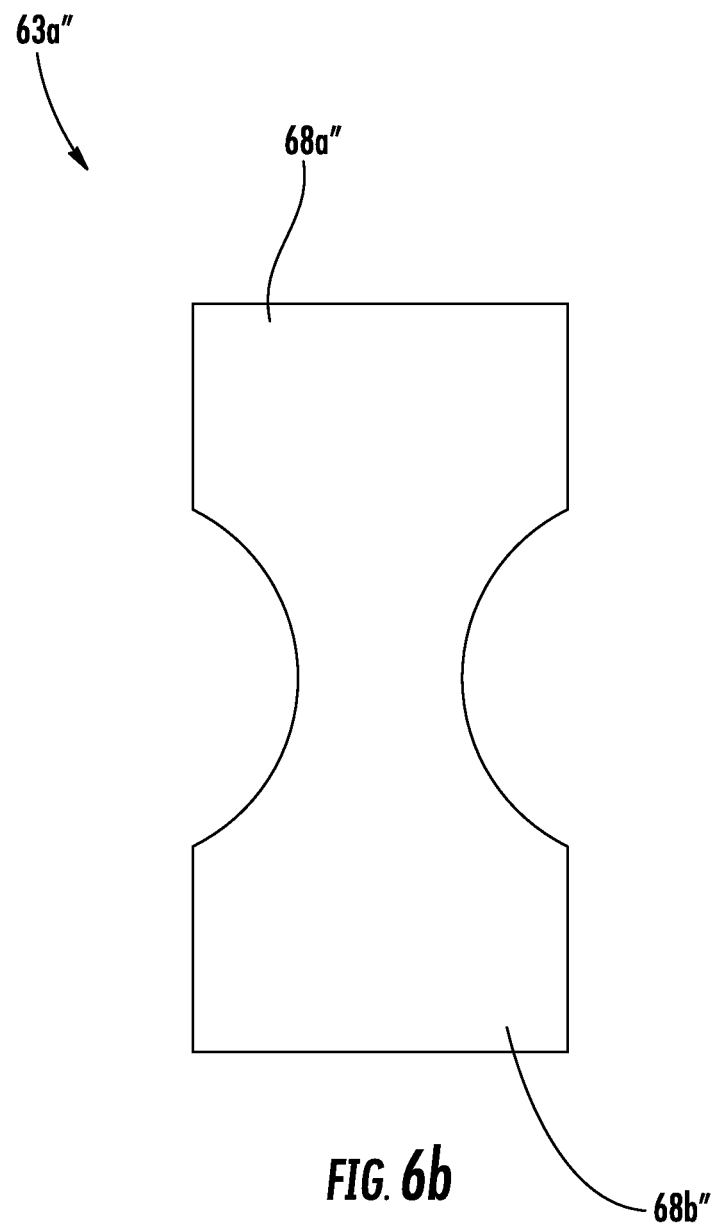
FIG. 6b is a side view of a parallel spaced apart flexible arm in accordance with an embodiment.
Figure 6C:
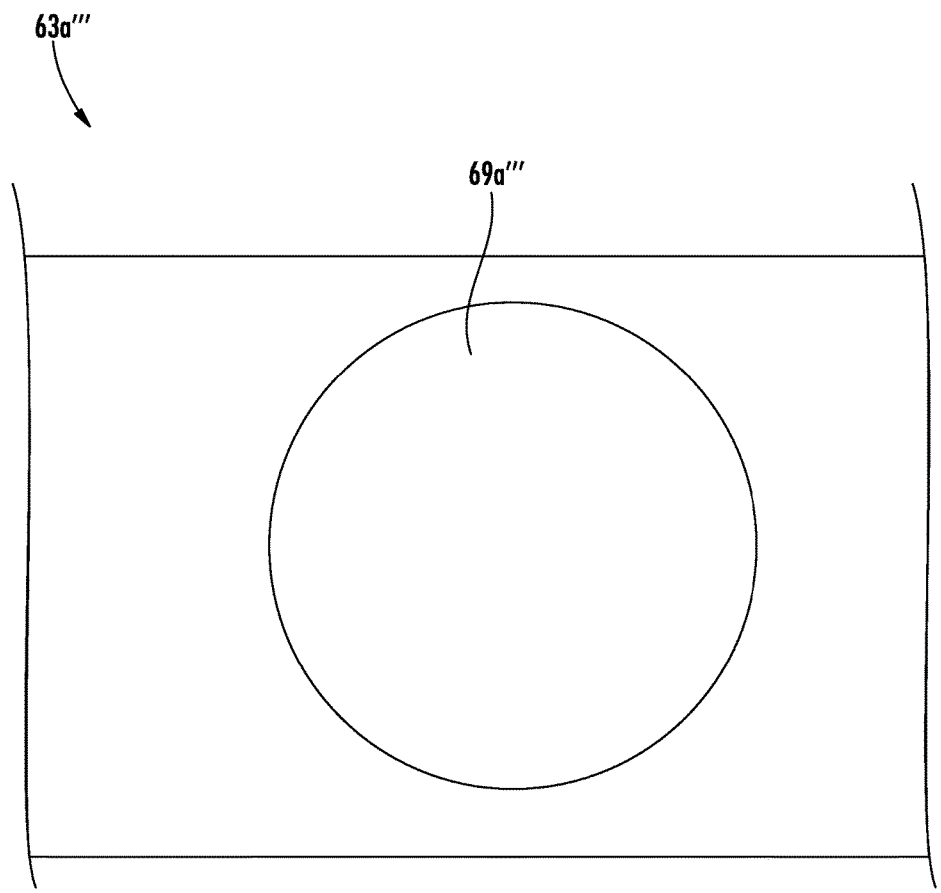
FIG. 6c is a side view of a portion of a parallel spaced apart flexible arm in accordance with an embodiment.

The pair of parallel spaced apart flexible arms 63a, 63b illustratively has a non-uniform thickness. Referring briefly to FIGS. 6a, 6b, and 6c, in some embodiments, the pair of parallel spaced apart flexible arms 63a' may include an enlarged width medial portion 67a' (FIG. 6a), enlarged width end portion's 68a" and 68b" (FIG. 6b), and/or one or more openings 69a'" (FIG. 6C) therein. By having a non-uniform thickness or having an opening therethrough, stress areas, which may be referred to as "stress hot spots," may be reduced by reducing the amount of material, thereby also increasing displacement.

Additionally, it may be desirable for the pair of parallel spaced apart flexible arms 63a, 63b to have a thickness that is a few times smaller than the height thereof. This may maintain a reasonable stiffness in directions other than along the motion axis, for example, as will be appreciated by those skilled in the art. More particularly, the pair of parallel spaced apart flexible arms 63a, 63b may have a thickness that is greater than or equal to half of the distance of the travel thereof (i.e., displacement) to reduce nonlinear stiffening. Reasonable nonlinear stiffening may be particularly advantageous for widening the spectrum, as will be appreciated by those skilled in the art.

Each flexure bearing 60a, 60b also includes an anchor member 64a, 64b coupled to the first end member 61a, 61b and coupled to the actuator housing 41. The anchor member 64a, 64b is also spaced from the second end member 62a, 62b. The anchor member 64a, 64b includes a T-shaped anchor body 65a, 65b and a pair of parallel spaced apart flexure arms 66a, 66b extending between the anchor body and the first end member 61a, 61b. In some embodiments, the anchor body 65a, 65b may have another shape.

The flexure bearings 60a, 60b mount each of the first and second sides 53, 54 of the field member 50 to be reciprocally movable within the actuator housing 41 responsive to the coils 44, 45. More particularly, the flexure bearings 60a, 60b move or flex in the direction of the field member 50 and return it to the equilibrium position. Overall flexure or movement of each flexure bearing 60a, 60b is about 1/10 of the length of the flexure bearing.

The haptic actuator 40 advantageously does not include, relative to other types of haptic actuators, shafts and/or bearings to constrain the motion of the mass 57 in a desired direction. Typically, to constrain angular motions, a second shaft or relatively complex stabilization techniques, such as stabilization magnets would be used. However, stabilization magnets may make the haptic actuator more complex, more unreliable, and increasingly expensive. By using the flexure bearings 60a, 60b, movement is generally constrained in every direction except the desired direction, and several relatively expensive parts may be omitted, such as shafts, precise bearings (round/slot), and springs, resulting in a more simple haptic actuator 40.

A method aspect is directed to a method of making a haptic actuator 40. The method may include positioning at least one coil 44, 45 to be carried by an actuator housing 41 and positioning a field member 50 having opposing first and second sides 53, 54 within the actuator housing 41. The method also includes positioning a respective flexure bearing 60a, 60b to mount each of the first and second sides 53, 54 of the field member 50 to be reciprocally movable within the housing responsive to the at least one coil 44, 45. Each flexure bearing 60a, 60b includes a first end member 61a, 61b, a second end member 62a, 62b coupled to an adjacent side of the field member, a pair of parallel spaced apart flexible arms 63a, 63b coupled between the first and second end members, and an anchor member 64a, 64b coupled to the first end member and coupled to the actuator housing.

Figure 7:
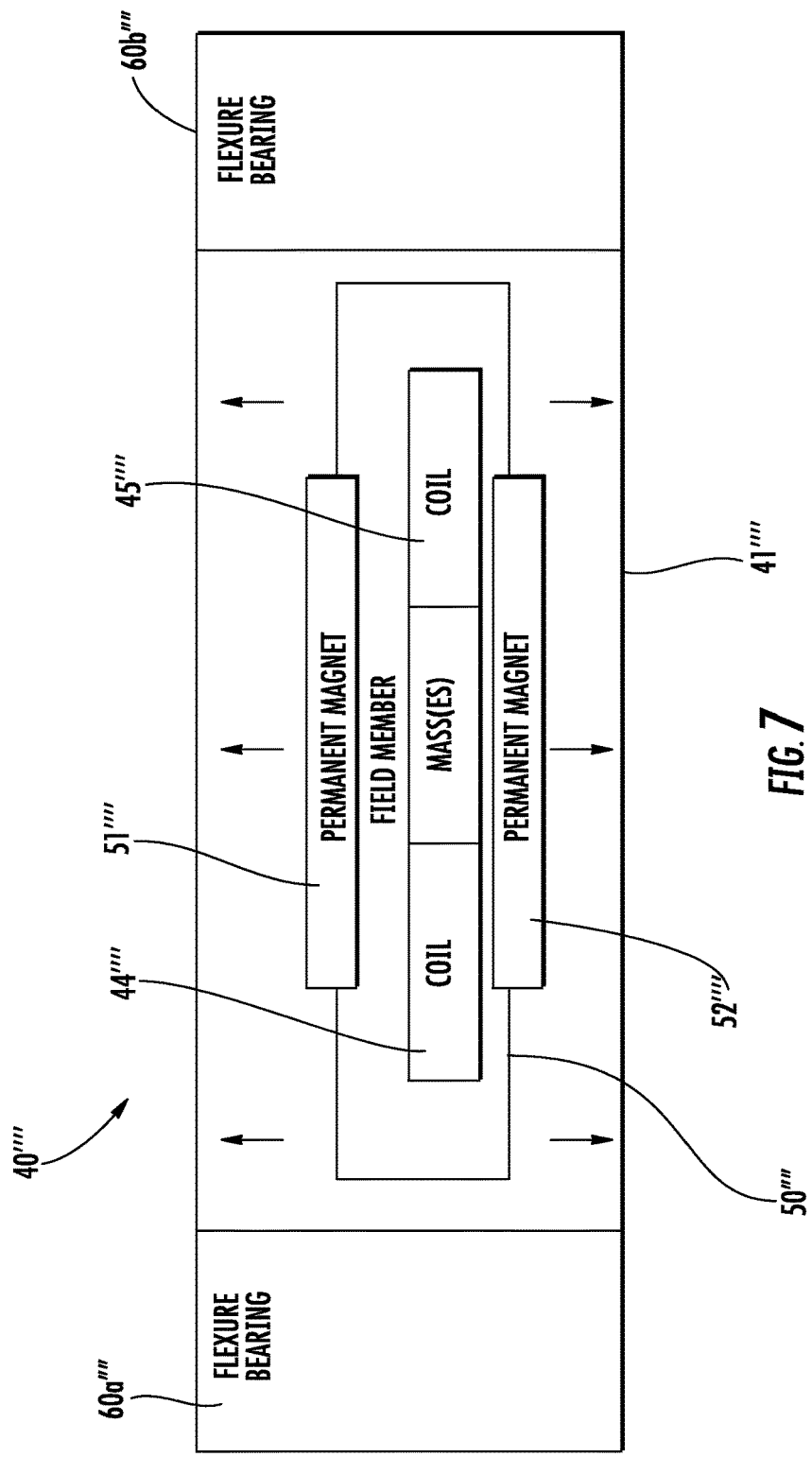
FIG. 7 is a schematic block diagram of an electronic device including a haptic actuator according to another embodiment.

Referring now to FIG. 7, in another embodiment, the haptic actuator 40'''' may include a permanent magnet 47'''' carried by the housing 41'''', and the field member 50'''' may include one or more coils that cooperate with the permanent magnet. In other words, in contrast to the embodiment described above, the permanent magnet is stationary (i.e., carried by the actuator housing 41'''') and the coils 44'''', 45'''', as part of the field member 50'''', are moving (i.e., connected to the mass). Of course, there may be any number of coils and/or permanent magnets.

Figure 8:
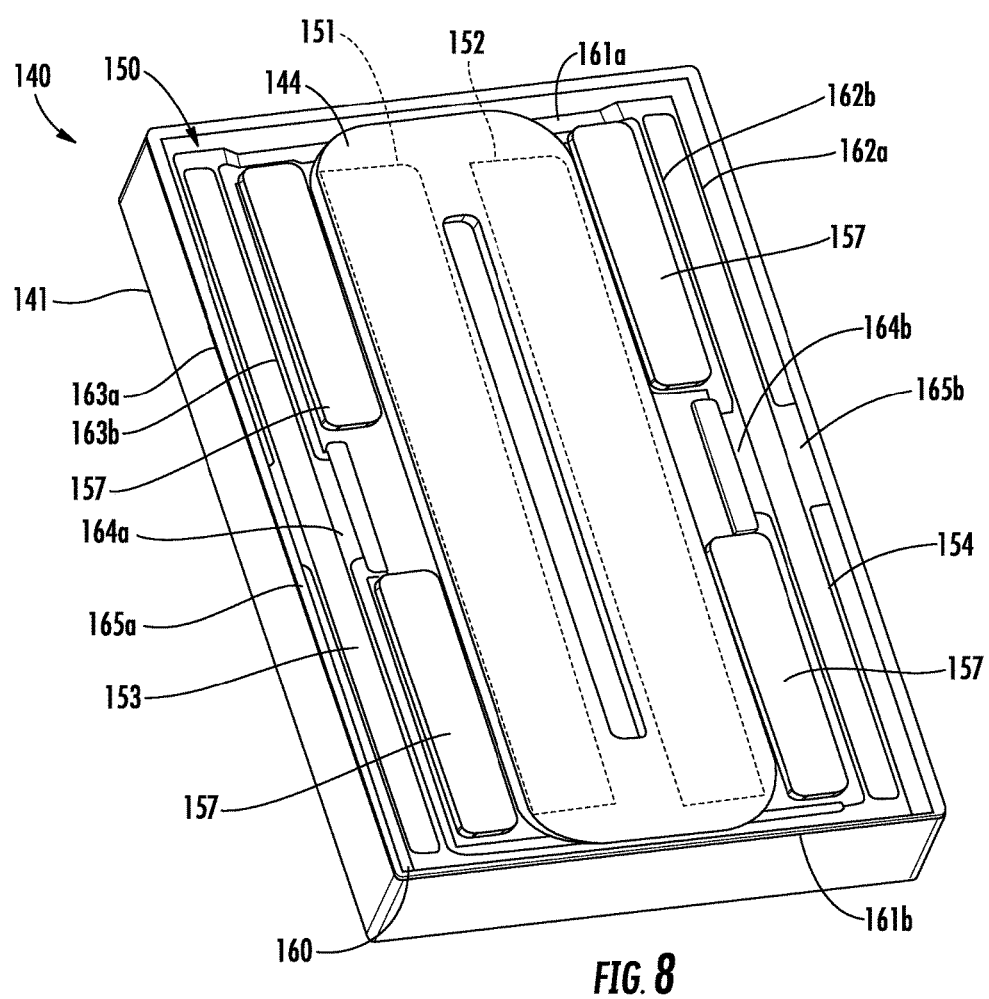
FIG. 8 is an enlarged perspective view of a portion of a haptic actuator according to another embodiment.

Referring now to FIG. 8, another embodiment of a haptic actuator 140 is illustrated. Similar to the haptic actuator 40 described above, the haptic actuator 140 includes an actuator housing 141 having a dimension in a length direction greater than a width direction and a coil 144 carried by the actuator housing. The coil 144 illustratively has a loop shape. A second coil, not shown, may be carried by the actuator housing 141 in spaced relation from the coil 144. Of course, there may be any number of coils 144, and the coil may have a different shape.

The haptic actuator 140 also includes a field member 150 having opposing first and second sides 153, 154. The field member 150, similarly to the actuator housing 141, has a dimension in a length direction greater than a width direction. Thus, the field member 150 is reciprocally movable in the width direction (i.e., the y-direction). While the movement of the field member 150 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 150 includes permanent magnets 151, 152 under the coil 144, or between the first and second coils. The permanent magnets 151, 152 may be neodymium, for example, and may be positioned in opposing directions with respect to their respective poles.

The permanent magnets 151, 152 also have a rectangular shape and are aligned along a length of the coil 144. While a pair of rectangular shaped permanent magnets is illustrated, it will be appreciated that there may be any number of permanent magnets having any shape.

The field member 150 also includes masses 157 adjacent the permanent magnets 151, 152. The masses 157 may be tungsten, for example. The masses 157 may be a different material and there may be more than one mass.

The haptic actuator 140 also includes a flexure bearing 160 mounting each of the first and second sides 153, 154 of the field member 150 to be reciprocally movable within the actuator housing 141 responsive to the coil 144. The flexure bearing 160 includes first and second opposing end members 161a, 161b, and two pairs of parallel spaced apart flexible arms 162a-162b, 163a-163b coupled between the first and second end members and spaced apart on opposing sides of the field member 150. In other embodiments, there may be more than two pairs of parallel spaced apart flexible arms 162a-162b, 163a-163b, or only one pair.

The haptic actuator 140 also includes first and second anchor members 164a-164b, 165a-165b each having a rectangular shape and respectively coupling one of each of the two pairs of parallel spaced apart flexible arms 162a-162b, 163a-163b. The first anchor members 164a, 164b are illustratively coupled between inner ones of the two pairs of the parallel spaced apart flexible arms and the adjacent portions of the field member 150. In particular, the first anchor members 164a, 164b are coupled to a medial portion of the field member 150 and a medial portion of the inner ones 162b, 163b of the pairs of parallel spaced apart flexible arms. In some embodiments, for example, where there is a single pair of parallel spaced apart flexible arms, there may be a single first anchor. In other embodiments, there may be more than two first anchors 164a, 164b.

The second anchor members 165a, 165b respectively couple the outer ones 162a-162b of each pair of parallel spaced apart flexible arms to adjacent portions of the actuator housing 141. In particular, the second anchor members 165a, 165b are coupled to a medial portion of the actuator housing 141 and a medial portion of the outer ones 163a, 162a of the pairs of the parallel spaced apart flexible arms respectively. In some embodiments, for example, where there is a single pair of parallel spaced apart flexible arms 162a-162b, 163a-163b, there may be a single second anchor member. In other embodiments, there may be more than two second anchor members 165a, 165b. Moreover, while the first and second anchor members 164a-164b, 165a-165b have been described as being rectangular, in some embodiments the first and second anchor members may be a different shape.

Figure 9:
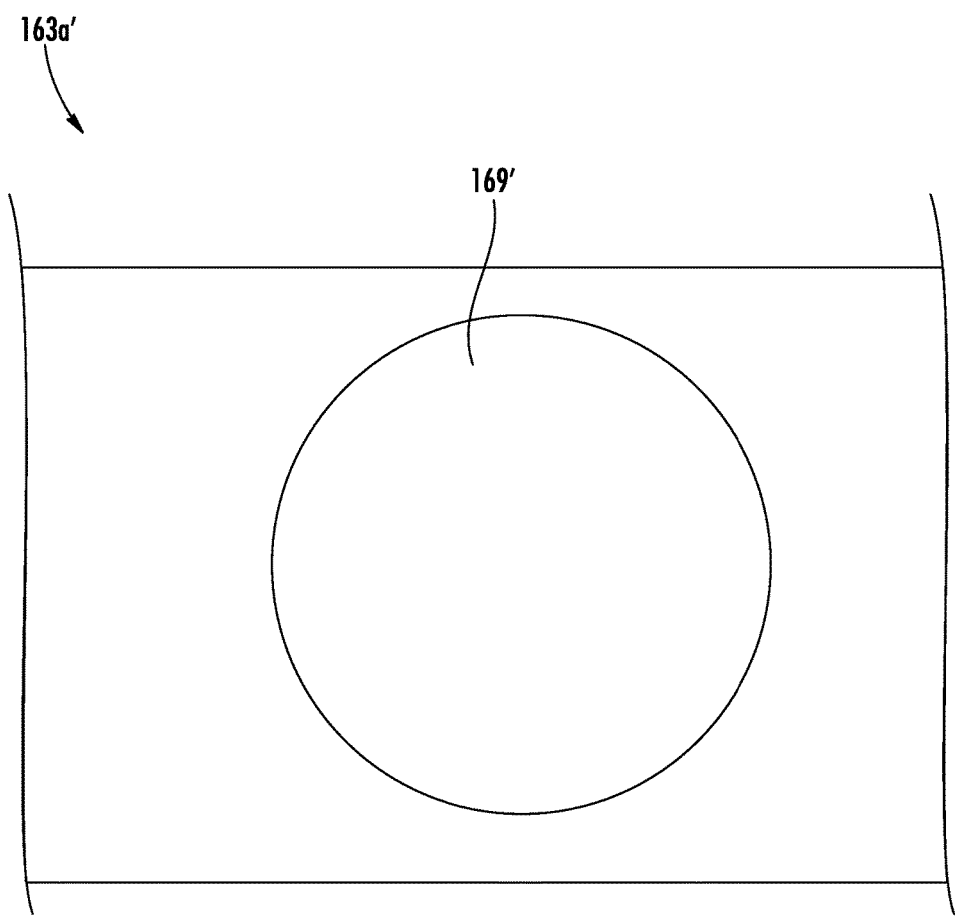
FIG. 9 is a side view of a portion of a parallel spaced apart flexible arm in accordance with an embodiment.

Each of the pairs of parallel spaced apart flexible arms 162a-162b, 163a-163b illustratively has a non-uniform height. Referring briefly to FIG. 9, in some embodiments, each of the pairs of parallel spaced apart flexible arms 163a' may include one or more openings therein 169'. By having a non-uniform height or having an opening therethrough, stress areas, which may be referred to as "stress hot spots," may be reduced by reducing the amount of material, thereby also increasing displacement.

A method aspect is directed to a method of making an actuator 140. The method includes positioning at least one coil 144 to be carried by the actuator housing 141. The method also includes positioning a field member 150 having opposing first and second sides 153, 154 within the housing and positioning the flexure bearing 160 to mount each of the first and second sides of the field member to be reciprocally movable within the housing responsive to the at least one coil 144.

Figure 10:
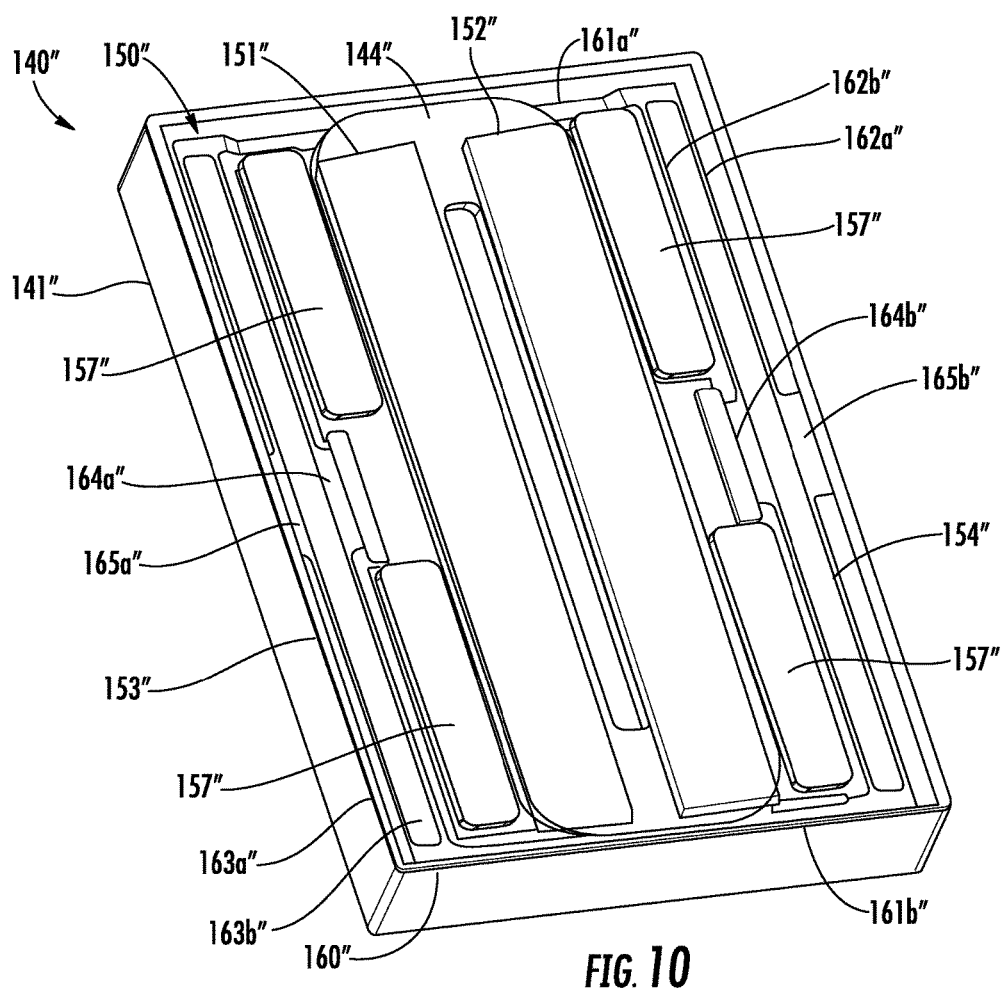
FIG. 10 is an enlarged perspective view of a haptic actuator in accordance with an embodiment.

Referring now to FIG. 10, in another embodiment, the haptic actuator 140" may include permanent magnets 151", 152" carried by the housing 141", and the field member 150" may include one or more coils 144" that cooperate with the permanent magnets. In other words, in contrast to the embodiment described above, the permanent magnets 151", 152" are stationary (i.e., carried by the actuator housing 141") and the coil 144", as part of the field member 150" is moving (i.e., connected to the masses 157"). Of course, there may be any number of coils and/or permanent magnets. For example, another set of permanent magnets may be carried on opposing sides of the coil 144" than the first and second magnets 151", 152"

Figure 11:
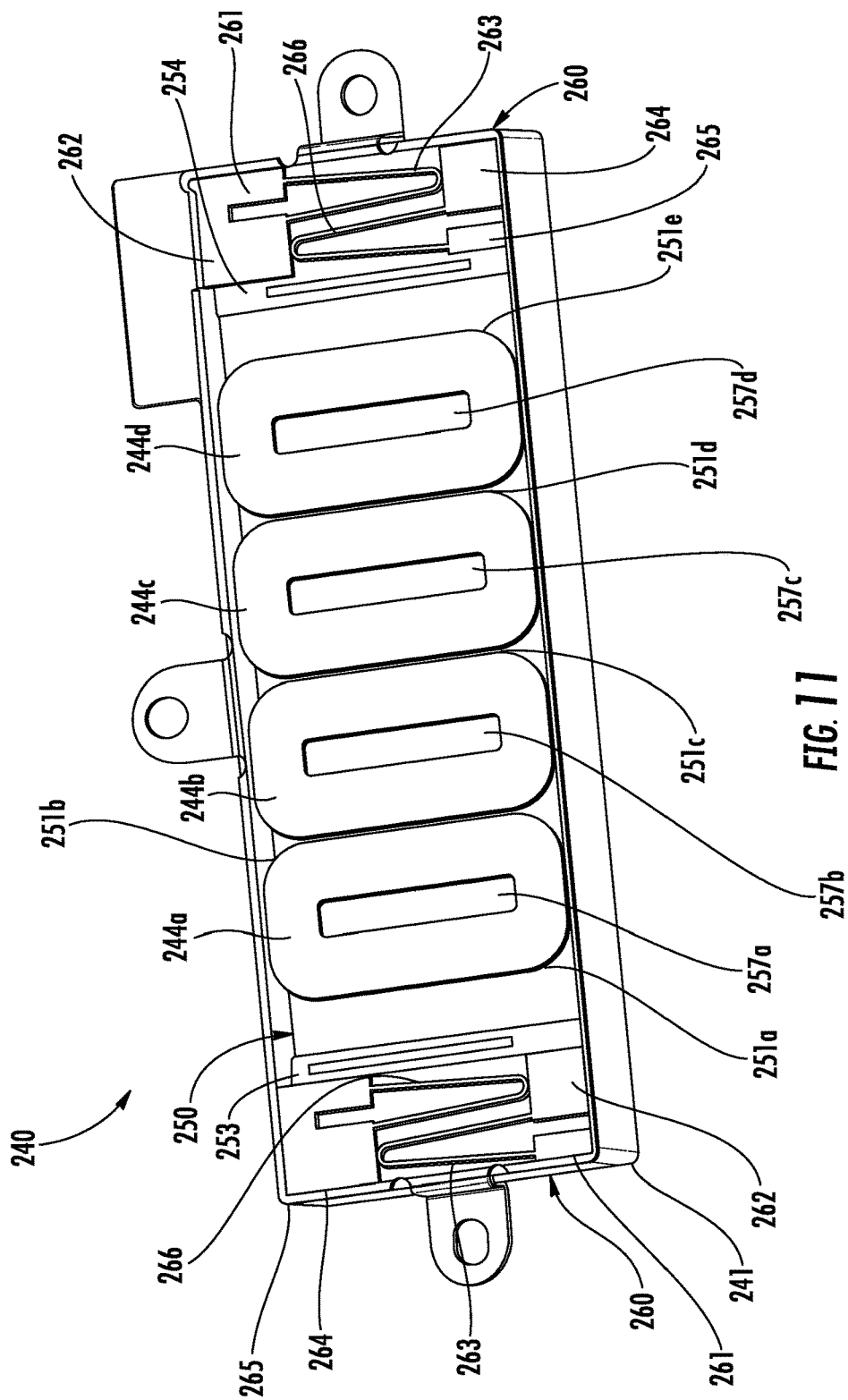
FIG. 11 is a perspective view of a portion of a haptic actuator according to an embodiment.
Figure 12:
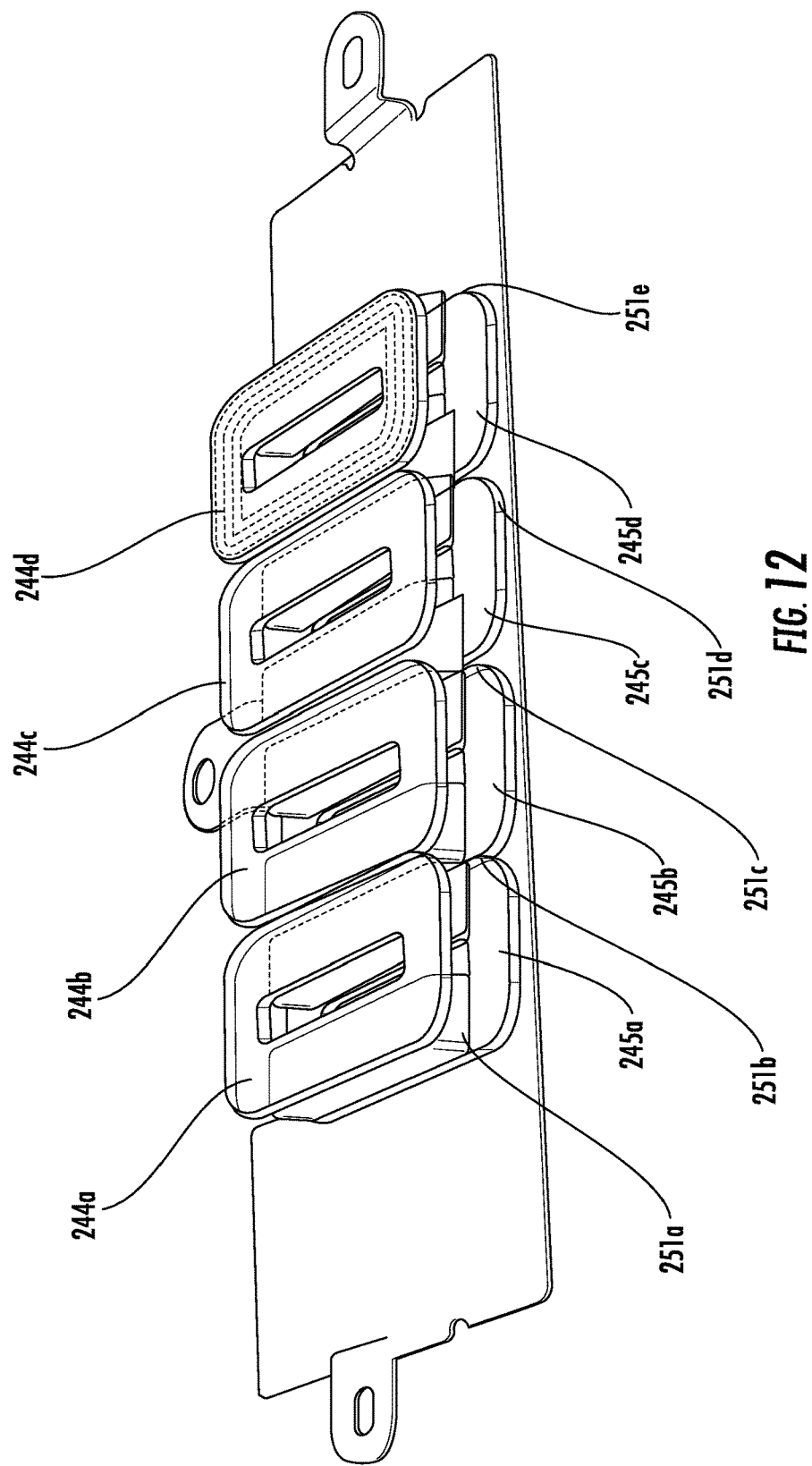
FIG. 12 is another perspective view of a portion of the haptic actuator in FIG. 11.

Referring now to FIGS. 11 and 12, another embodiment of a haptic actuator 240 is illustrated. The haptic actuator 240 includes an actuator housing 241 having a dimension in a length direction greater than a width direction and first and second sets of coils 244a-244d, 245a-245d are carried by the actuator housing 241 in spaced apart relation by the top and bottom of the actuator housing. The coils 244a-244d, 245a-245d each illustratively have a loop shape and each extends along a width of the actuator housing 241. Each of the first set of coils 244a-244d is in side-by-side relation. Each of the second set of coils 245a-245d, is also in side-by-side relation. While four first coils 244a-244d and four second coils 245a-245d are illustrated, it will be appreciated by those skilled in the art that there may be any number of coils 244a-244d, 245a-245d, and the coils may have a different shape.

The haptic actuator 240 also includes a field member 250 having opposing first and second sides 253, 254. The field member 250, similarly to the actuator housing 241, has a dimension in a length direction greater than a width direction. Thus, the field member 250 is reciprocally movable in the length direction (i.e., the x-direction). While the movement of the field member 250 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 250 includes permanent magnets 251a-251e between the first and second sets of coils 244a-244d, 245a-245d. The permanent magnets 251a-251e may be neodymium, for example, and may be positioned in opposing directions with respect to their respective poles.

The permanent magnets 251a-251e also each have a rectangular shape and are spaced apart along a length of the actuator housing 241. While rectangular shaped permanent magnets 251a-251e are illustrated, it will be appreciated that there may be any number of permanent magnets having any shape between the first and second coils 244a-244d, 245a-245d.

The field member 250 also includes masses 257a-257d between the permanent magnets 251, 252. The masses 257a-257d may be tungsten, for example. The masses 257a-257d may be a different material and there may be more or less than the three masses illustrated. The masses 257a-257d may be part of a body of the field member 250, for example members extending across the actuator housing 241.

The haptic actuator 240 also includes a respective flexure bearing 260 mounting each of the first and second sides 253, 254 of the field member 250 to be reciprocally movable within the actuator housing 241 responsive to the first and second sets of coils 244a-244d, 245a-245d. Each flexure bearing 260 includes a first anchor member 261 coupled to an adjacent portion of the actuator housing 241, more particularly, adjacent an end and a side (i.e., a corner) of the actuator housing. A second anchor member 262 is coupled to an adjacent side of the field member 250 and also adjacent the first side 247a of the actuator housing 241. The first and second anchor members 261, 262 are illustratively spaced apart at an initial at-rest position. However, under compression, for example, the first and second anchor members 261, 262 may be in contact, as will be appreciated by those skilled in the art.

A first flexible arm 263 couples the first and second anchor members 261, 262 together. The first flexible arm 263 has a bend therein to define a V-shape, for example. The first flexible arm 263 may have more than one bend therein.

Each flexure bearing 260 also includes a third anchor member 264 coupled to an adjacent portion of the actuator housing 241, illustratively in a corner opposite the first anchor member 261. A fourth anchor member 265 is coupled to an adjacent side of the field member 250 opposite the second anchor member 262 and also adjacent the second side of the actuator housing 241. A second flexible arm 266 couples the third and fourth anchor members 264, 265 together and has a bend therein, for example, to also define a V-shape. The second flexible arm 266 may have more than one bend therein.

A method aspect is directed to a method of making a haptic actuator 240. The method includes positioning at least one coil 244a-244d to be carried by an actuator housing 241 and positioning a field member 250 having opposing first and second sides 253, 254 within the actuator housing. The method also includes positioning respective flexure bearings 260 to mount each of the first and second sides 253, 254 of the field member 250 to be reciprocally movable within the actuator housing responsive to the at least one coil.

Figure 13:
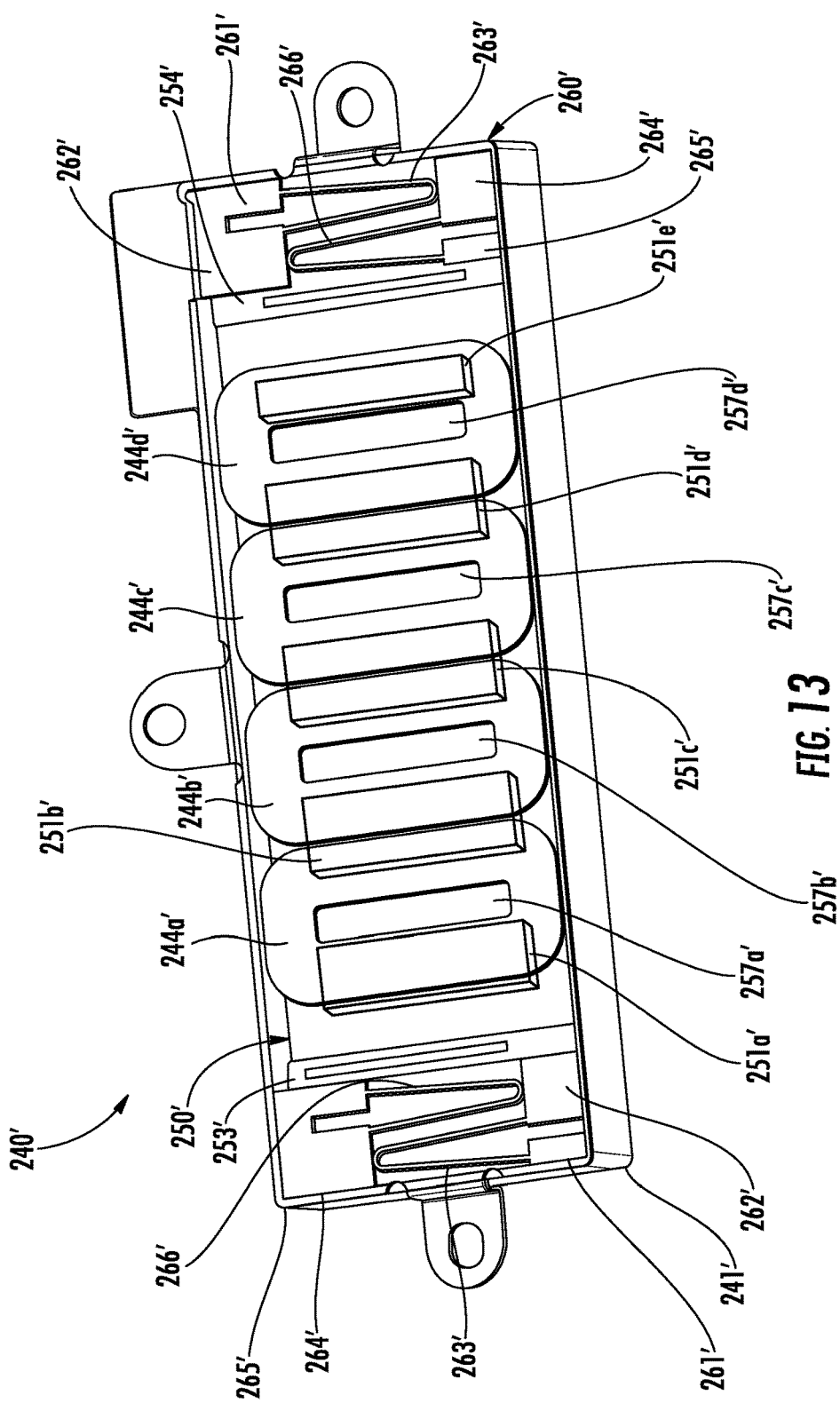
FIG. 13 is a perspective view of a haptic actuator according to another embodiment.

Referring now to FIG. 13, in another embodiment, the haptic actuator 240' may include permanent magnets 251a'-251d' carried by the housing 241', and the field member 250' may include coils 244a'-244d' that cooperate with the permanent magnets. In other words, in contrast to the embodiment described above, the permanent magnets are stationary (i.e., carried by the actuator housing 241') and the coils 244a'-244d' as part of the field member 250' are moving (i.e., connected to the masses 257a'-257d'). Of course, there may be any number of coils and/or permanent magnets. For example, there may be a second set of permanent magnets carried on an opposing side of the coils 244a'-244d'.

Figure 14:
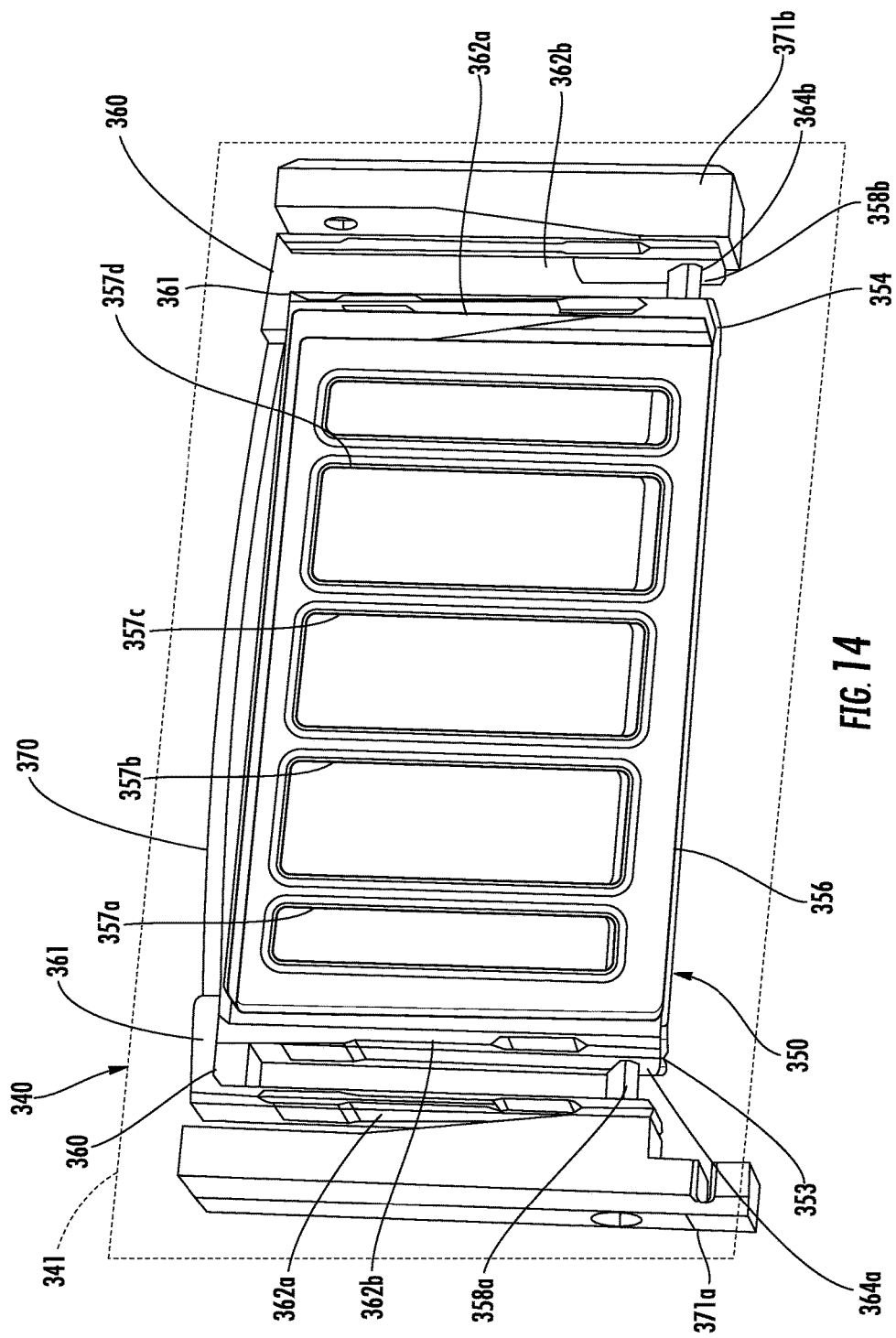
FIG. 14 is a perspective view of a portion of a haptic actuator according to an embodiment.
Figure 15:
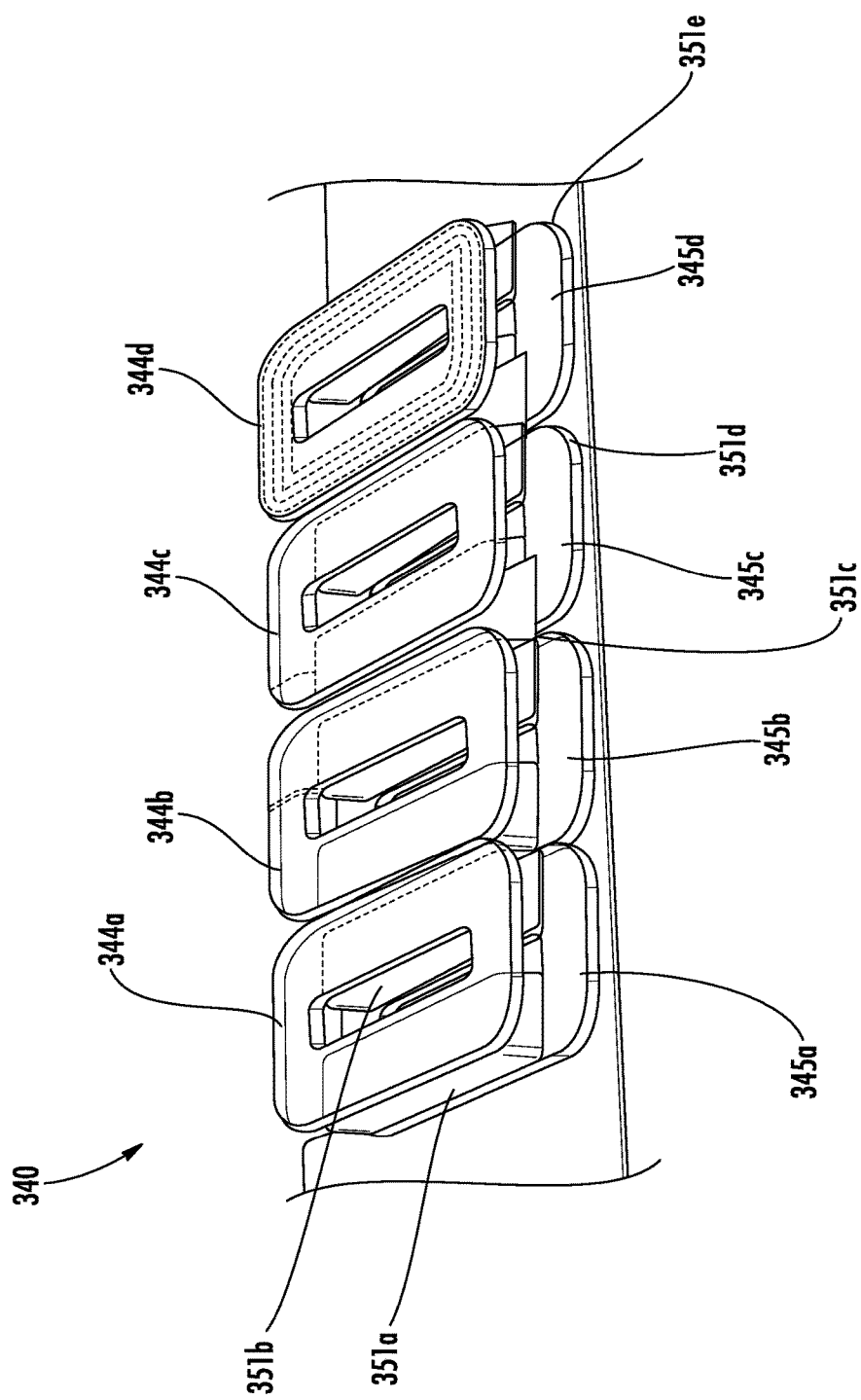
FIG. 15 is a perspective view of another portion of the haptic actuator in FIG. 14.

Referring now to FIGS. 14 and 15, another embodiment of a haptic actuator 340 is illustrated. The haptic actuator 340 includes an actuator housing 341 having a dimension in a length direction greater than a width direction and first and second sets of coils 344a-344d, 345a-345d are carried by the actuator housing in spaced apart relation by the top and bottom of the actuator housing. The coils 344a-344d, 345a-345d each illustratively has a loop shape and each extends along a width of the actuator housing 341. Each of the first set of coils 344a-344d is in side-by-side relation. Each of the second set of coils 345a-345d, is also in side-by-side relation. While four first coils 344a-344d and four second coils 345a-345d are illustrated, it will be appreciated by those skilled in the art that there may be any number of coils, and the coils may have a different shape.

The haptic actuator 340 also includes a field member 350 having opposing first and second sides 353, 354. The field member 350, similarly to the actuator housing 341, has a dimension in a length direction greater than a width direction. Thus, the field member 350 is reciprocally movable in the length direction (i.e., the x-direction). While the movement of the field member 350 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 350 includes permanent magnets 351a-351e between the first and second sets of coils 344a-344d, 345a-345d. The permanent magnets 351a-351e may be neodymium, for example, and may be positioned in opposing directions with respect to their respective poles.

The permanent magnets 351a-351e also each have a rectangular shape and are spaced apart along a length of the actuator housing 341. While rectangular shaped permanent magnets 351a-351e are illustrated, it will be appreciated that there may be any number of permanent magnets having any shape.

The field member 350 also includes a body 356 that includes masses 357a-357d between the permanent magnets 351a-351e. The masses 357a-357d may be tungsten, for example. The masses 357a-357d may be a different material and there may be any number of masses. The field member 350 also includes shafts 358a, 358b extending outwardly from the body 357 adjacent the first and second ends 353, 354.

The haptic actuator 340 also illustratively includes a frame member 370 extending along a first side of the actuator housing 341. A respective flexure bearing 360 is carried by the frame member 370 and mounts each of the first and second ends 353, 354 of the field member 350 to be reciprocally movable within the actuator housing 341 responsive to the first and second coils 344a-344d, 345a-345d.

Each flexure bearing 360 includes a base member 361 coupled to an end of the frame member 370, and spaced apart flexible arms 362a, 362b extending outwardly from the base member to a second side of the actuator housing 341. The spaced apart flexible arms 362a, 362b are spaced apart at distal ends thereof at an initial at-rest position, and may be parallel at the initial at-rest position. When the flexure bearing 360 is under compression, the spaced apart flexible arms 362a, 362b may contact one another at the distal ends thereof. The spaced apart flexible arms 362a, 362b also illustratively include an opening 364a, 364b therein for receiving respective ones of the shafts 358a, 358b therein.

The haptic actuator 340 also includes a respective guide member 371a, 371b coupled between a respective end of the actuator housing 341 and a respective flexure bearing 360. Each guide member 371a, 371b has an opening 372a, 372b therein for receiving a respective one of the shafts 358a, 358b. Each guide member 371a, 371b also has a tapered shape, and more particularly, a width that is decreasing along the width thereof. A thinner or smaller end of each guide member is adjacent the base member of each flexure bearing 360, for example, to permit the field member 350 to have a larger displacement along the movement or travel path (i.e., the x-axis). As will be appreciated by those skilled in the art, the distal ends of the spaced apart flexible arms slide on the shafts 358a, 358b. In some embodiments, there may be no shafts and openings.

A method aspect is directed to a method of making a haptic actuator 340. The method includes positioning at least one coil 344a-344d, 345a-345d to be carried by an actuator housing 341 and positioning a field member 350 having opposing first and second sides 353, 354 within the actuator housing. The method also includes positioning the respective flexure bearing 360 to mount each of the first and second sides 353, 354 of the field member 350 to be reciprocally movable within the housing responsive to the at least one coil 344a-344d, 345a-345d.

Figure 16:
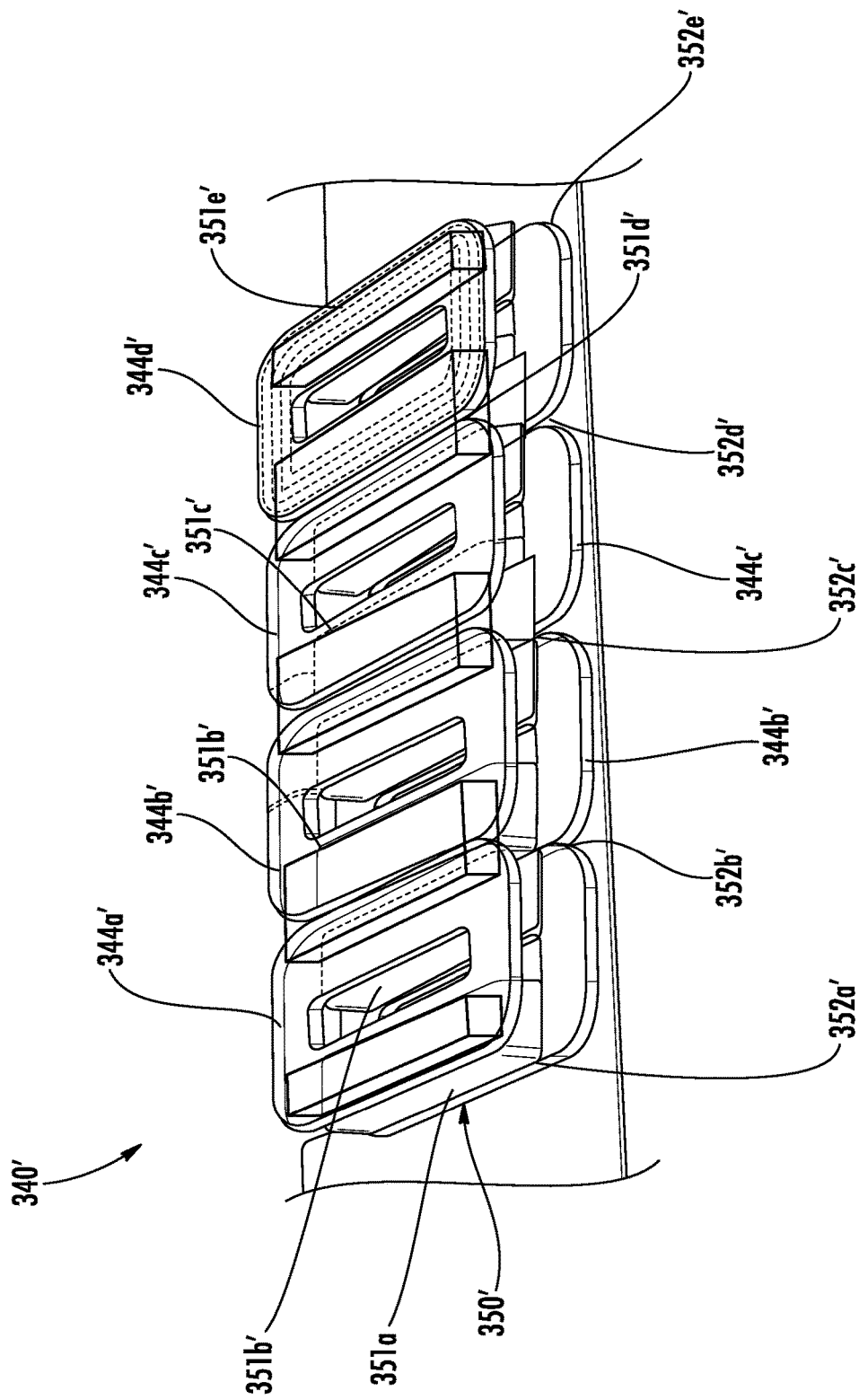
FIG. 16 is a perspective view of a portion of a haptic actuator in accordance with another embodiment.

Referring to FIG. 16, in another embodiment, the haptic actuator 340' may include first and second sets of permanent magnets 351a'-351e', 352a'-352e' carried by the housing, and the field member 350' may include coils 344a'-344d' that cooperate with the permanent magnets, and more particularly, that are between the first and second sets of permanent magnets. In other words, in contrast to the embodiment described above, the permanent magnets 351a'-351e', 352a'-352e' are stationary (i.e., carried by the actuator housing 341') and the coils 344a'-344d' as part of the field member 350' are moving (i.e., connected to the masses). Of course, there may be any number of coils and/or permanent magnets.

Figure 17:
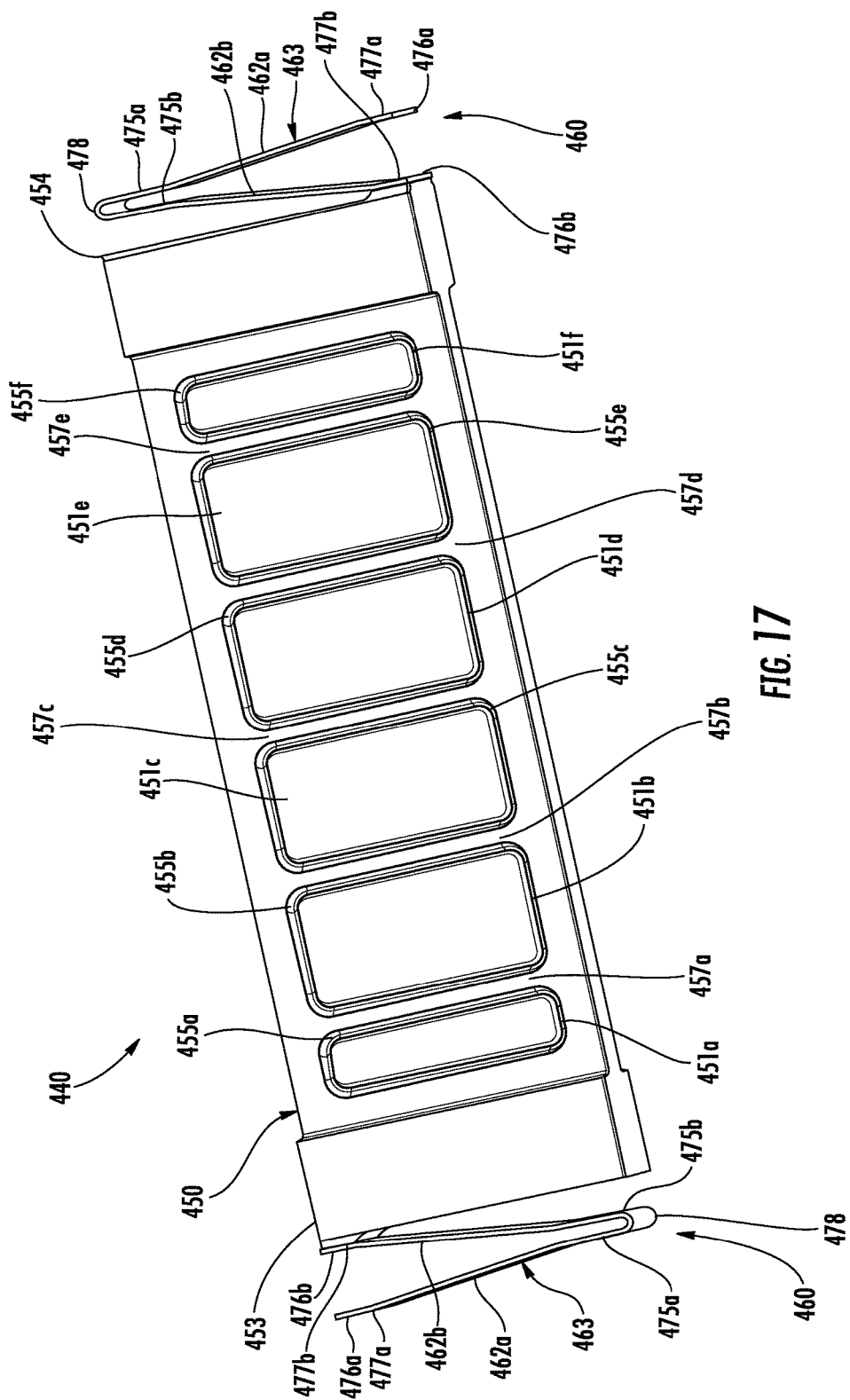
FIG. 17 is a perspective view of a portion of a haptic actuator according to an embodiment.
Figure 18:
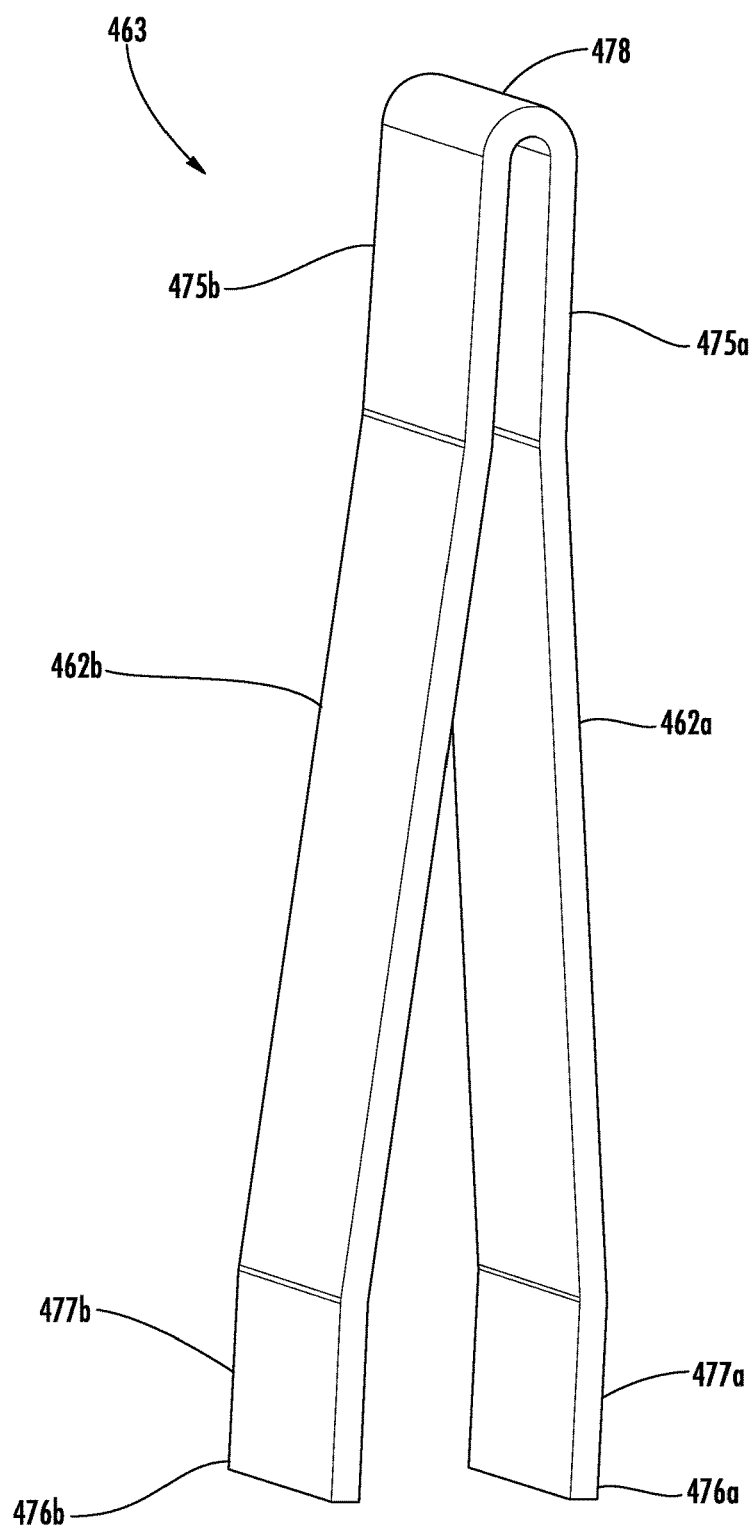
FIG. 18 is an enlarged perspective view of the flexible member of FIG. 17.

Referring now to FIGS. 17 and 18, another embodiment of a haptic actuator 440 is illustrated. The haptic actuator 440 may include an actuator housing having a dimension in a length direction greater than a width direction and first and second sets of coils carried by the actuator housing in spaced apart relation, for example, as described above.

The haptic actuator 440 also includes a field member 450 having opposing first and second sides 453, 454. The field member 450, similarly to the actuator housing, has a dimension in a length direction greater than a width direction. Thus, the field member 450 is reciprocally movable in the length direction (i.e., the x-direction). While the movement of the field member 450 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 450 includes permanent magnets 451a-451f that are positioned between the first and second sets of coils. The permanent magnets 451a-451f may be neodymium, for example, and may be positioned in opposing directions with respect to their respective poles.

The permanent magnets 451a-451f also each have a rectangular shape and are spaced apart along a length of the field member 450, and more particularly, spaced within openings 455a-455f in the field member 450. While rectangular shaped permanent magnets 451a-451f are illustrated, it will be appreciated that there may be any number of permanent magnets having any shape between and the openings 455a-455f may also have any shape.

The field member 450 also includes masses 457a-457e between the permanent magnets 451a-451f. The masses 457a-457e are illustratively part of the body of the field member 450, for example, members extending across the field member and defining the openings 455a-455f. Of course, the masses 457a-457e can be arranged as described above with respect to the other embodiments.

The haptic actuator 440 also includes a respective flexure bearing 460 mounting each of the first and second sides 453, 454 of the field member 450 to be reciprocally movable within the actuator housing responsive to the first and second sets of coils. Each flexure bearing 460 includes a flexible member 463 having a wishbone or Y-shape, with two diverging arms 462a, 462b joined together at proximal ends 475a, 475b. The two diverging arms 462a, 462b have spaced distal ends 476a, 476b operatively coupled between adjacent portions of the field member 450 and the housing.

The flexible member 463 has a bend 478 therein joining together the two diverging arms 462a, 462b at the proximal ends 475a, 475b. The bend 478 causes the two diverging arms 462a, 462b to be spaced apart at the distal ends 476a, 476b. Illustratively, the two diverging arms 462a, 462b include a parallel portion 477a, 477b at the distal ends 476a, 476b. In some embodiments, the distal ends 476a, 476b of the two diverging arms 462a, 462b may continue to diverge instead of turning or becoming parallel.

Figure 19:
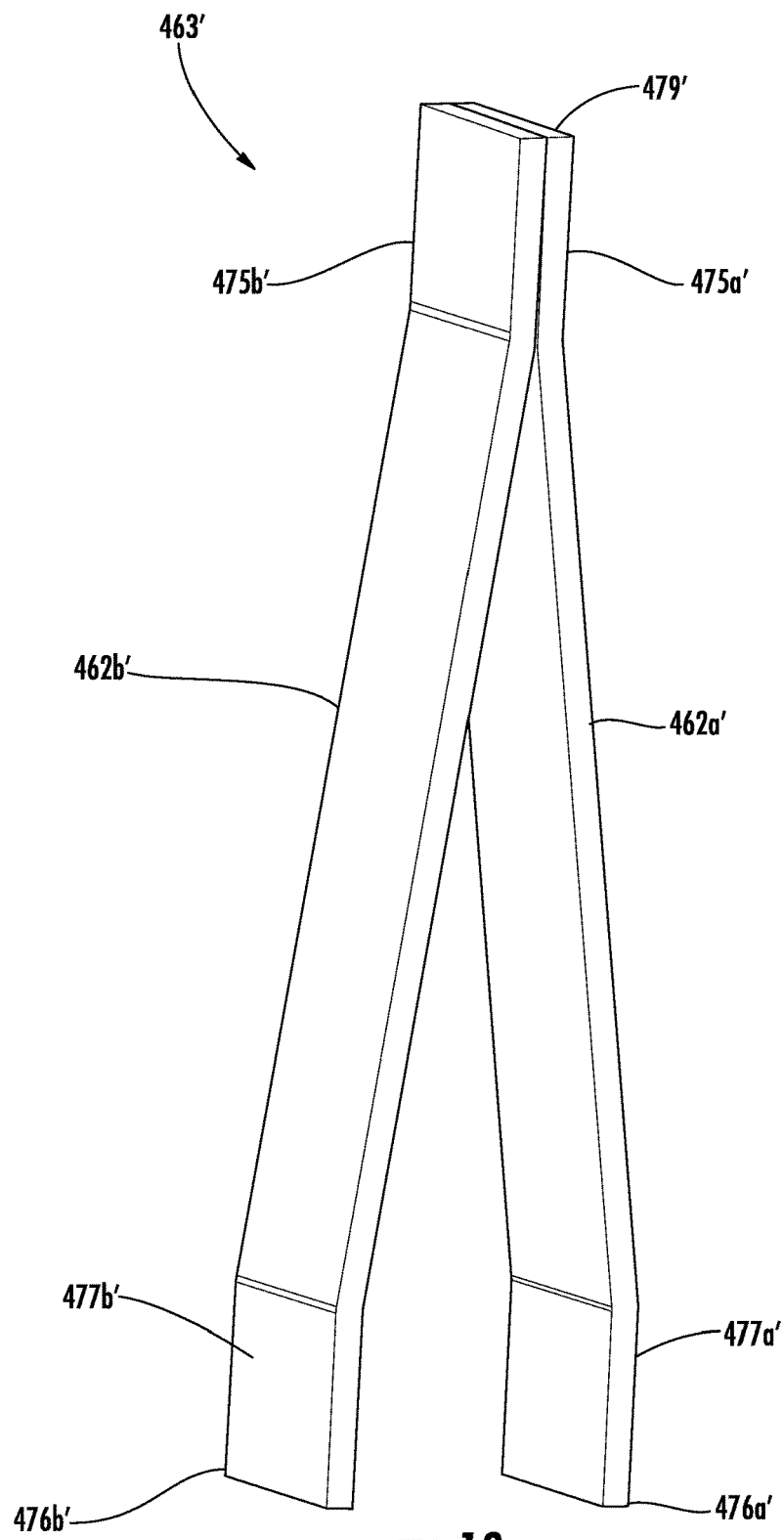
FIG. 19 is an enlarged perspective view of a flexible member according to another embodiment.

Referring briefly to FIG. 19 in another embodiment, the two diverging arms 462a', 462b' are parallel at the proximal ends 475a', 475b' and are coupled together, for example, via a weld joint 479'.

Figure 20:
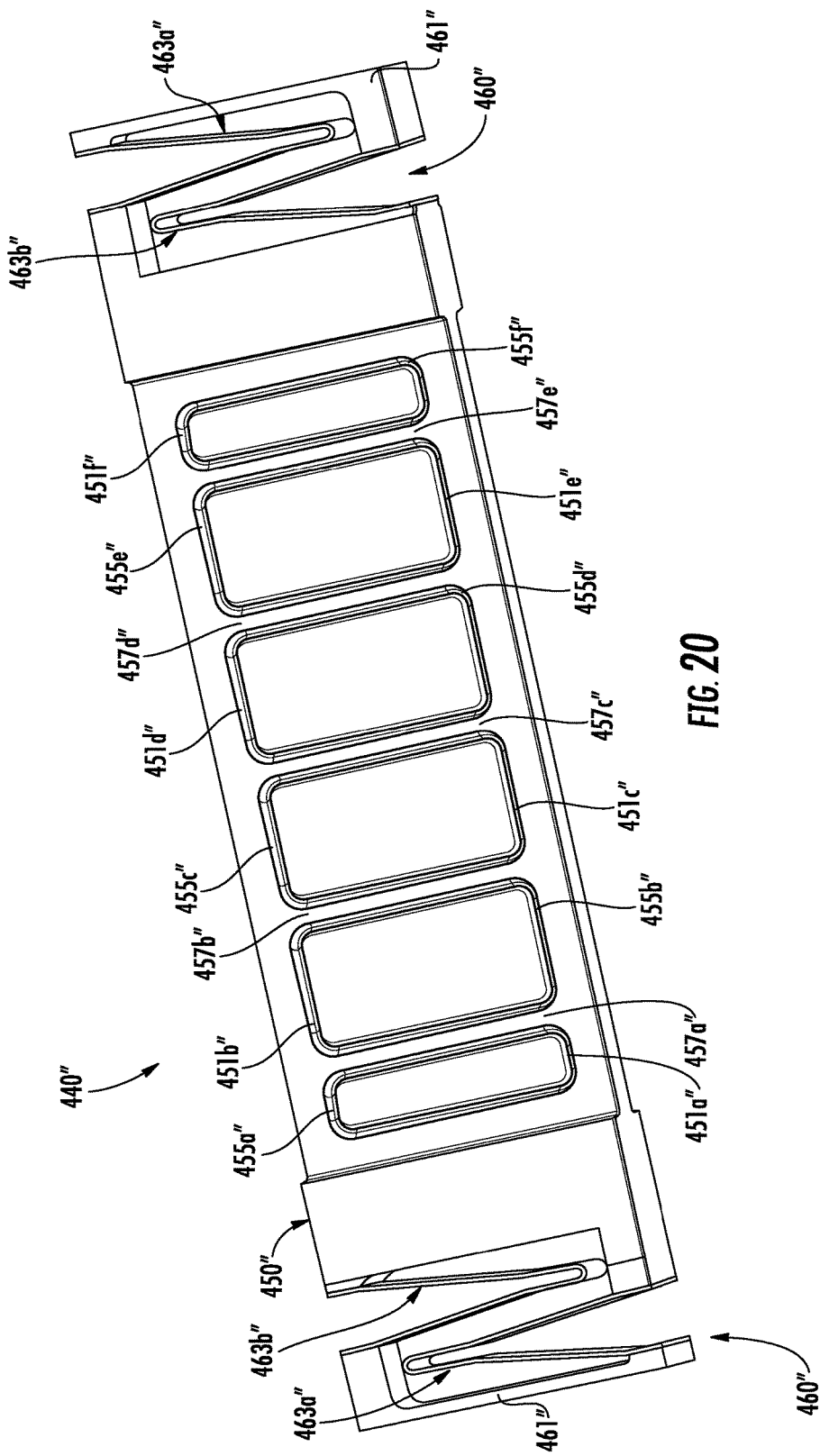
FIG. 20 is a perspective view of a portion of a haptic actuator according to an embodiment.

Referring now to FIG. 20, in another embodiment, each flexure bearing 460" may include first and second flexible members 463a", 463b". A respective anchor member 461" is coupled to an adjacent portion of the housing and spaced from an adjacent portion of the field member 450". The anchor member 461" is illustratively L-shaped, having a length aligned along the adjacent portion of the housing. The first and second flexible members 463a", 463b" are coupled between the respective anchor member 461" and the adjacent portions of the field member 450". The first and second flexible members 463a", 463b" are arranged so that the proximal end of the first flexible member 463a" is adjacent the distal end of the second flexible member 463b".

The table below illustrates exemplary mode shapes and frequencies versus design. Indeed, as will be appreciated by those skilled in the art, the wishbone or Y-shaped design of the flexible member 463 may provide increased stability versus a U or V-shaped flexible member, for example.

| | Mode | | | |
|---|---|---|---|---|
| | X Mode | Rocking Z Mode | Z Mode | Y Mode |
| U/V Shaped w/o magnetic anti-spring | 100 Hz | 285 Hz | 316 Hz | 329 Hz |
| Wishbone Shaped w/o magnetic anti-spring | 100 Hz | 381 Hz | 382 Hz | 405 Hz |
| U/V Shaped w/ magnetic anti-spring | 100 Hz | Unstable | 128 Hz | 329 Hz |
| Wishbone Shaped w/ magnetic anti-spring | 100 Hz | 250 Hz | 251 Hz | 405 Hz |

A method aspect is directed to a method of making a haptic actuator 440. The method includes positioning at least one coil to be carried by an actuator housing and positioning a field member 450 having opposing first and second sides 453, 454 within the actuator housing. The method also includes positioning respective flexure bearings 460 to mount each of the first and second sides 453, 454 of the field member 450 to be reciprocally movable within the actuator housing responsive to the at least one coil.

Figure 21:
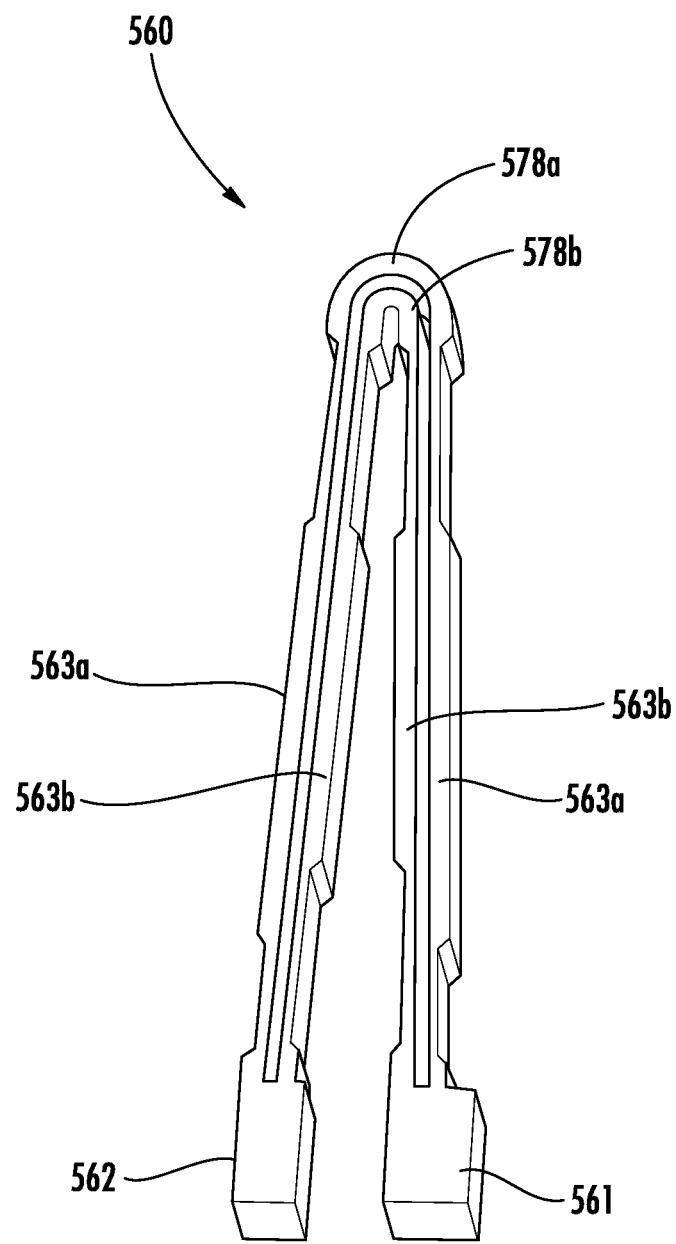
FIG. 21 is an enlarged perspective view of a flexure bearing for use with a field member of a haptic actuator in accordance with an embodiment.

Referring now to FIG. 21, another embodiment of a flexure bearing 560 is illustrated for use with a field member in a haptic actuator as described above. As will be appreciated by those skilled in the art and along the lines as described above, two flexure bearings 560 are typically used in the haptic actuator.

Each flexure bearing 560 includes a first anchor member 561 coupled to an adjacent portion of the actuator housing, and more particularly, adjacent an end and a side (i.e., a corner) of the actuator housing. A second anchor member 562 is coupled to an adjacent side of the field member and also adjacent the first side of the actuator housing. The first and second anchor members 561, 562 are illustratively spaced apart at an initial at-rest position. However, under compression, for example, the first and second anchor members 561, 562 may be in contact, as will be appreciated by those skilled in the art.

First and second parallel, spaced apart flexible arms 563a, 563b each couple the first and second anchor members 561, 562 together. The first and second flexible arms 563a, 563b each has a bend 578a, 578b therein to define a V-shape, for example. The first and second parallel and spaced apart flexible arms 563a, 563b may each have more than one bend therein. The first and second parallel, spaced apart flexible arms 563a, 563b may each have a varying thickness along a length thereof (e.g., from the first anchor member 561 through the bend 578a, 578b to the second anchor member 562). While two parallel, spaced apart flexible arms are illustrated, it will be appreciated that any number of parallel, spaced apart flexible arms 563a, 563b may couple the first and second anchor members 561, 562.

A method aspect is directed to a method of making a haptic actuator. The method includes positioning at least one coil to be carried by an actuator housing and positioning a field member having opposing first and second sides within the actuator housing. The method also includes positioning respective flexure bearings 560 to mount each of the first and second sides of the field member to be reciprocally movable within the actuator housing responsive to the at least one coil.

Indeed, while various embodiments have been described with respect to various flexure bearing configurations and coil and permanent magnet configurations, it should be understood that elements from any of the embodiments may be used with any of the other embodiments. For example, a given haptic actuator may include more than one type of flexure bearing as described herein, for example, to not only allow movement of the field member, but return it to an equilibrium position.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
a housing;
at least one coil carried by the housing;
a field member having opposing first and second sides; and
a respective at least one flexure bearing mounting each of the first and second sides of the field member to be reciprocally movable within the housing responsive to the at least one coil;
each flexure bearing comprising at least one flexible member having a wishbone shape with two diverging arms joined together at proximal ends and having spaced distal ends operatively coupled between adjacent portions of the field member and the housing.

2. The haptic actuator of claim 1 wherein the at least one flexible member has a bend therein joining together the two diverging arms at the proximal ends.

3. The haptic actuator of claim 1 wherein the two diverging arms include respective portions being spaced apart adjacent the proximal ends.

4. The haptic actuator of claim 1 wherein the two diverging arms are coupled together at the proximal ends.

5. The haptic actuator of claim 1 wherein the at least one flexible member comprises a plurality thereof.

6. The haptic actuator of claim 1 wherein each flexure bearing further comprises at least one anchor member coupled to the adjacent portion of the housing and spaced from the adjacent portion of the field member.

7. The haptic actuator of claim 6 wherein the at least one flexible member is coupled between the at least one anchor member and the field member.

8. An electronic device comprising:
a housing;
wireless communications circuitry carried by the housing;
a haptic actuator carried by the housing and comprising
an actuator housing,
at least one coil carried by the actuator housing,
a field member having opposing first and second sides, and
a respective at least one flexure bearing mounting each of the first and second sides of the field member to be reciprocally movable within the actuator housing responsive to the at least one coil,
each flexure bearing comprising at least one flexible member having a wishbone shape with two diverging arms joined together at proximal ends and having spaced distal ends operatively coupled between adjacent portions of the field member and the actuator housing; and
a controller coupled to the wireless communications circuitry and the haptic actuator and configured to perform at least one wireless communications function and selectively operating the haptic actuator.

9. The electronic device of claim 8 wherein the at least one flexible member has a bend therein joining together the two diverging arms at the proximal ends.

10. The electronic device of claim 8 wherein the two diverging arms include respective portions being spaced apart adjacent the proximal ends.

11. The electronic device of claim 8 wherein the two diverging arms are coupled together at the proximal ends.

12. The electronic device of claim 8 wherein the at least one flexible member comprises a plurality thereof.

13. The electronic device of claim 8 wherein each flexure bearing further comprises at least one anchor member coupled to the adjacent portion of the housing and spaced from the adjacent portion of the field member.

14. The electronic device of claim 13 wherein the at least one flexible member is coupled between the at least one anchor member and the field member.

15. A method of making a haptic actuator comprising:
positioning a respective at least one flexure bearing to mount each of first and second sides of a field member to be reciprocally movable within a housing responsive to at least one coil, each flexure bearing comprising at least one flexible member having a wishbone shape with two diverging arms joined together at proximal ends and having spaced distal ends operatively coupled between adjacent portions of the field member and the housing.

16. The method of claim 15 wherein the at least one flexible member has a bend therein joining together the two diverging arms at the proximal ends.

17. The method of claim 15 wherein the two diverging arms include respective portions being spaced apart adjacent the proximal ends.

18. The method of claim 15 wherein the two diverging arms are coupled together at the proximal ends.

19. The method of claim 15 wherein the at least one flexible member comprises a plurality thereof.

20. The method of claim 15 wherein each flexure bearing further comprises at least one anchor member coupled to the adjacent portion of the housing and spaced from the adjacent portion of the field member.

* * * * *